(12) United States Patent
Venkatraman et al.

(10) Patent No.: US 10,868,661 B2
(45) Date of Patent: Dec. 15, 2020

(54) SYSTEMS AND METHODS FOR EFFICIENTLY-TRANSFORMED DIGITAL SELF-INTERFERENCE CANCELLATION

(71) Applicant: Kumu Networks, Inc., Sunnyvale, CA (US)

(72) Inventors: Sundeep Venkatraman, Sunnyvale, CA (US); Rajendra Tushar Moorti, Sunnyvale, CA (US)

(73) Assignee: Kumu Networks, Inc., Sunnyvale, CA (US)

(*) Notice: Subject to any disclaimer, the term of this patent is extended or adjusted under 35 U.S.C. 154(b) by 0 days.

(21) Appl. No.: 16/820,193

(22) Filed: Mar. 16, 2020

(65) Prior Publication Data

US 2020/0295912 A1 Sep. 17, 2020

Related U.S. Application Data

(60) Provisional application No. 62/818,264, filed on Mar. 14, 2019.

(51) Int. Cl.
*H04L 12/28* (2006.01)
*H04L 5/14* (2006.01)
(Continued)

(52) U.S. Cl.
CPC .......... *H04L 5/1461* (2013.01); *G06F 17/142* (2013.01); *H04B 1/525* (2013.01);
(Continued)

(58) Field of Classification Search
CPC .. H04B 1/0475; H04B 1/1081; H04B 7/0619; H04L 27/2628; H04L 25/0328
(Continued)

(56) References Cited

U.S. PATENT DOCUMENTS 106,515 A 8/1870 Smith
2,267,946 A 12/1941 Pitman
(Continued)

FOREIGN PATENT DOCUMENTS

CN 1204898 A 1/1999
CN 1901362 A 1/2007
(Continued)

OTHER PUBLICATIONS

Adib et al., "See Through Walls with Wi-Fi" Proceedings of the ACM SIGCOMM 2013 conference on SIGCOMM '13, pp. 75-86, ACM, New York, NY, USA, (2013).
(Continued)

*Primary Examiner* — John Pezzlo
(74) *Attorney, Agent, or Firm* — Jeffrey Schox; Samuel Rosenthal

(57) ABSTRACT

An efficiently-transformed digital self-interference canceller, preferably including an FD transformer, a TD transformer, a channel estimator, a composer, and a controller. The canceller can optionally include a channel memory, a predictor, and/or an extender. A method for digital self-interference cancellation, preferably including receiving inputs, transforming the inputs, generating outputs based on the transformed inputs, transforming the outputs, and/or generating a cancellation signal based on the outputs.

19 Claims, 11 Drawing Sheets

(51) Int. Cl.
*H04B 1/525* (2015.01)
*G06F 17/14* (2006.01)
*H04L 25/03* (2006.01)
*H04L 25/02* (2006.01)
*H04L 27/26* (2006.01)
*H04J 1/16* (2006.01)

(52) U.S. Cl.
CPC .......... *H04L 5/143* (2013.01); *H04L 25/0204* (2013.01); *H04L 25/0328* (2013.01); *H04L 27/2628* (2013.01)

(58) Field of Classification Search
USPC .................. 370/210, 252, 286, 329, 386
See application file for complete search history.

(56) References Cited

U.S. PATENT DOCUMENTS

| | | |
|---|---|---|
| 3,922,617 A | 11/1975 | Denniston et al. |
| 4,321,624 A | 3/1982 | Gibson et al. |
| 4,395,688 A | 7/1983 | Sellers |
| 4,952,193 A | 8/1990 | Talwar |
| 5,027,253 A | 6/1991 | Lauffer et al. |
| 5,212,827 A | 5/1993 | Meszko et al. |
| 5,262,740 A | 11/1993 | Willems |
| 5,278,529 A | 1/1994 | Willems |
| 5,355,103 A | 10/1994 | Kozak |
| 5,691,978 A | 11/1997 | Kenworthy |
| 5,734,305 A | 3/1998 | Ervasti |
| 5,734,957 A | 3/1998 | Ogawa et al. |
| 5,734,967 A | 3/1998 | Kotzin et al. |
| 5,790,658 A | 8/1998 | Yip et al. |
| 5,818,385 A | 10/1998 | Bartholomew |
| 5,930,301 A | 7/1999 | Chester et al. |
| 6,037,848 A | 3/2000 | Alila et al. |
| 6,215,812 B1 | 4/2001 | Young et al. |
| 6,240,150 B1 | 5/2001 | Darveau et al. |
| 6,300,849 B1 | 10/2001 | Takeda |
| 6,307,169 B1 | 10/2001 | Sun et al. |
| 6,411,250 B1 | 6/2002 | Oswald et al. |
| 6,490,328 B1 | 12/2002 | Wu |
| 6,539,204 B1 | 3/2003 | Marsh et al. |
| 6,567,649 B2 | 5/2003 | Souissi |
| 6,580,771 B2 | 6/2003 | Kenney |
| 6,583,021 B2 | 6/2003 | Song |
| 6,612,987 B2 | 9/2003 | Morsy et al. |
| 6,639,551 B2 | 10/2003 | Li et al. |
| 6,657,950 B1 | 12/2003 | Jones et al. |
| 6,686,879 B2 | 2/2004 | Shattil |
| 6,725,017 B2 | 4/2004 | Blount et al. |
| 6,778,599 B1 | 8/2004 | Doron |
| 6,784,766 B2 | 8/2004 | Allison et al. |
| 6,815,739 B2 | 11/2004 | Huff et al. |
| 6,907,093 B2 | 6/2005 | Blount et al. |
| 6,915,112 B1 | 7/2005 | Sutton et al. |
| 6,965,657 B1 | 11/2005 | Rezvani et al. |
| 6,975,186 B2 | 12/2005 | Hirabayashi |
| 6,985,705 B2 | 1/2006 | Shohara |
| 7,057,472 B2 | 6/2006 | Fukamachi et al. |
| 7,139,543 B2 | 11/2006 | Shah |
| 7,177,341 B2 | 2/2007 | McCorkle |
| 7,188,135 B2 | 3/2007 | Takatori et al. |
| 7,228,104 B2 | 6/2007 | Collins et al. |
| 7,230,316 B2 | 6/2007 | Yamazaki et al. |
| 7,239,219 B2 | 7/2007 | Brown et al. |
| 7,266,358 B2 | 9/2007 | Hillstrom |
| 7,302,024 B2 | 11/2007 | Arambepola |
| 7,336,128 B2 | 2/2008 | Suzuki et al. |
| 7,336,940 B2 | 2/2008 | Smithson |
| 7,348,844 B2 | 3/2008 | Jaenecke |
| 7,349,505 B2 | 3/2008 | Blount et al. |
| 7,362,257 B2 | 4/2008 | Bruzzone et al. |
| 7,372,420 B1 | 5/2008 | Osterhues et al. |
| 7,397,843 B2 | 7/2008 | Grant et al. |
| 7,426,242 B2 | 9/2008 | Thesling |
| 7,468,642 B2 | 12/2008 | Bavisi et al. |
| 7,508,898 B2 | 3/2009 | Cyr et al. |
| 7,509,100 B2 | 3/2009 | Toncich |
| 7,622,989 B2 | 11/2009 | Tzeng et al. |
| 7,667,557 B2 | 2/2010 | Chen |
| 7,706,755 B2 | 4/2010 | Muhammad et al. |
| 7,733,813 B2 | 6/2010 | Shin et al. |
| 7,773,759 B2 | 8/2010 | Alves et al. |
| 7,773,950 B2 | 8/2010 | Wang et al. |
| 7,778,611 B2 | 8/2010 | Asai et al. |
| 7,825,751 B2 | 11/2010 | Kawaguchi et al. |
| 7,869,527 B2 | 1/2011 | Vetter et al. |
| 7,948,878 B2 | 5/2011 | Briscoe et al. |
| 7,962,170 B2 | 6/2011 | Axness et al. |
| 7,987,363 B2 | 7/2011 | Chauncey et al. |
| 7,990,231 B2 | 8/2011 | Morikaku et al. |
| 7,999,715 B2 | 8/2011 | Yamaki et al. |
| 8,005,235 B2 | 8/2011 | Rebandt et al. |
| 8,023,438 B2 | 9/2011 | Kangasmaa et al. |
| 8,027,642 B2 | 9/2011 | Proctor et al. |
| 8,031,744 B2 | 10/2011 | Radunovic et al. |
| 8,032,183 B2 | 10/2011 | Rudrapatna |
| 8,055,235 B1 | 11/2011 | Gupta et al. |
| 8,060,803 B2 | 11/2011 | Kim |
| 8,081,695 B2 | 12/2011 | Chrabieh et al. |
| 8,085,831 B2 | 12/2011 | Teague |
| 8,086,191 B2 | 12/2011 | Fukuda et al. |
| 8,090,320 B2 | 1/2012 | Dent et al. |
| 8,093,963 B2 | 1/2012 | Yamashita et al. |
| 8,155,046 B2 | 4/2012 | Jung et al. |
| 8,155,595 B2 | 4/2012 | Sarin et al. |
| 8,160,176 B2 | 4/2012 | Dent et al. |
| 8,175,535 B2 | 5/2012 | Mu |
| 8,179,990 B2 | 5/2012 | Orlik et al. |
| 8,218,697 B2 | 7/2012 | Guess et al. |
| 8,270,456 B2 | 9/2012 | Leach et al. |
| 8,274,342 B2 | 9/2012 | Tsutsumi et al. |
| 8,300,561 B2 | 10/2012 | Elahi et al. |
| 8,306,480 B2 | 11/2012 | Muhammad et al. |
| 8,325,001 B2 | 12/2012 | Huang et al. |
| 8,331,477 B2 | 12/2012 | Huang et al. |
| 8,345,433 B2 | 1/2013 | White et al. |
| 8,349,933 B2 | 1/2013 | Bhandari et al. |
| 8,351,533 B2 | 1/2013 | Shrivastava et al. |
| 8,378,763 B2 | 2/2013 | Wakata |
| 8,385,855 B2 | 2/2013 | Lorg et al. |
| 8,385,871 B2 | 2/2013 | Wyville |
| 8,391,878 B2 | 3/2013 | Tenny |
| 8,410,871 B2 | 4/2013 | Kim et al. |
| 8,417,750 B2 | 4/2013 | Yan et al. |
| 8,422,540 B1 | 4/2013 | Negus et al. |
| 8,428,542 B2 | 4/2013 | Bornazyan |
| 8,446,892 B2 | 5/2013 | Ji et al. |
| 8,456,230 B2 | 6/2013 | Fratti |
| 8,457,549 B2 | 6/2013 | Weng et al. |
| 8,462,697 B2 | 6/2013 | Park et al. |
| 8,467,757 B2 | 6/2013 | Ahn |
| 8,498,585 B2 | 7/2013 | Vandenameele |
| 8,502,623 B2 | 8/2013 | Lee et al. |
| 8,502,924 B2 | 8/2013 | Liou et al. |
| 8,509,129 B2 | 8/2013 | Deb et al. |
| 8,521,090 B2 | 8/2013 | Kim et al. |
| 8,547,188 B2 | 10/2013 | Plager et al. |
| 8,576,752 B2 | 11/2013 | Sarca |
| 8,600,331 B2 | 12/2013 | Kravets |
| 8,611,401 B2 | 12/2013 | Lakkis |
| 8,619,916 B2 | 12/2013 | Jong |
| 8,625,686 B2 | 1/2014 | Li et al. |
| 8,626,090 B2 | 1/2014 | Dalipi |
| 8,649,417 B2 | 2/2014 | Baldemair et al. |
| 8,711,943 B2 | 4/2014 | Rossato et al. |
| 8,744,377 B2 | 6/2014 | Rimini et al. |
| 8,750,786 B2 | 6/2014 | Larsson et al. |
| 8,755,756 B1 | 6/2014 | Zhang et al. |
| 8,767,869 B2 | 7/2014 | Rimini et al. |
| 8,787,907 B2 | 7/2014 | Jain et al. |
| 8,798,177 B2 | 8/2014 | Park et al. |
| 8,804,975 B2 | 8/2014 | Harris et al. |
| 8,837,332 B2 | 9/2014 | Khojastepour et al. |

(56) References Cited

U.S. PATENT DOCUMENTS

| | | |
|---|---|---|
| 8,842,584 B2 | 9/2014 | Jana et al. |
| 8,879,433 B2 | 11/2014 | Khojastepour et al. |
| 8,879,811 B2 | 11/2014 | Liu et al. |
| 8,913,528 B2 | 12/2014 | Cheng et al. |
| 8,929,550 B2 | 1/2015 | Shattil et al. |
| 8,995,410 B2 | 3/2015 | Balan et al. |
| 9,014,069 B2 | 4/2015 | Patil et al. |
| 9,019,849 B2 | 4/2015 | Hui et al. |
| 9,031,567 B2 | 5/2015 | Haub |
| 9,042,838 B2 | 5/2015 | Braithwaite |
| 9,054,795 B2 | 6/2015 | Choi et al. |
| 9,065,519 B2 | 6/2015 | Cyzs et al. |
| 9,077,421 B1 | 7/2015 | Mehlman et al. |
| 9,112,476 B2 | 8/2015 | Basaran et al. |
| 9,124,475 B2 | 9/2015 | Li et al. |
| 9,130,747 B2 | 9/2015 | Zinser et al. |
| 9,136,883 B1 | 9/2015 | Moher et al. |
| 9,160,430 B2 | 10/2015 | Maltsev et al. |
| 9,166,766 B2 | 10/2015 | Jana et al. |
| 9,184,902 B2 | 11/2015 | Khojastepour et al. |
| 9,185,711 B2 | 11/2015 | Lin et al. |
| 9,231,647 B2 | 1/2016 | Polydoros et al. |
| 9,231,712 B2 | 1/2016 | Hahn et al. |
| 9,236,996 B2 | 1/2016 | Khandani |
| 9,264,024 B2 | 2/2016 | Shin et al. |
| 9,276,682 B2 | 3/2016 | Bharadia et al. |
| 9,312,895 B1 | 4/2016 | Gupta et al. |
| 9,325,432 B2 | 4/2016 | Hong et al. |
| 9,331,737 B2 | 5/2016 | Hong et al. |
| 9,413,500 B2 | 8/2016 | Chincholi et al. |
| 9,413,516 B2 | 8/2016 | Khandani |
| 9,455,761 B2 | 9/2016 | Bharadia et al. |
| 9,461,698 B2 | 10/2016 | Moffatt et al. |
| 9,490,963 B2 | 11/2016 | Choi et al. |
| 9,537,543 B2 | 1/2017 | Choi |
| 9,647,705 B2 | 5/2017 | Pack et al. |
| 9,698,860 B2 | 7/2017 | Bharadia et al. |
| 9,698,861 B2 | 7/2017 | Braithwaite |
| 9,713,010 B2 | 7/2017 | Khandani |
| 9,742,593 B2 | 8/2017 | Moorti et al. |
| 9,935,757 B2 | 4/2018 | Chung et al. |
| 9,973,224 B2 | 5/2018 | Liu et al. |
| 10,103,774 B1 | 10/2018 | Moorti et al. |
| 10,200,217 B2 | 2/2019 | Moorti et al. |
| 2002/0034191 A1 | 3/2002 | Shattil |
| 2002/0064245 A1 | 5/2002 | McCorkle |
| 2002/0072344 A1 | 6/2002 | Souissi |
| 2002/0109631 A1 | 8/2002 | Li et al. |
| 2002/0154717 A1 | 10/2002 | Shima et al. |
| 2002/0172265 A1 | 11/2002 | Kenney |
| 2003/0022395 A1 | 1/2003 | Olds |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0112860 A1 | 6/2003 | Erdogan |
| 2003/0148748 A1 | 8/2003 | Shah |
| 2003/0222732 A1 | 12/2003 | Matthaei |
| 2004/0106381 A1 | 6/2004 | Tiller |
| 2004/0266378 A1 | 12/2004 | Fukamachi et al. |
| 2005/0030888 A1 | 2/2005 | Thesling |
| 2005/0078743 A1 | 4/2005 | Shohara |
| 2005/0094722 A1 | 5/2005 | Takatori et al. |
| 2005/0101267 A1 | 5/2005 | Smithson |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0195915 A1* | 9/2005 | Raleigh ............... H04L 25/021 375/267 |
| 2005/0242830 A1 | 11/2005 | Humphrey et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0083297 A1 | 4/2006 | Yan et al. |
| 2006/0153283 A1 | 7/2006 | Scharf et al. |
| 2006/0209754 A1 | 9/2006 | Ji et al. |
| 2006/0240769 A1 | 10/2006 | Proctor et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0207748 A1 | 9/2007 | Toncich |
| 2007/0223617 A1 | 9/2007 | Lee et al. |
| 2007/0249314 A1 | 10/2007 | Sanders et al. |
| 2007/0274372 A1 | 11/2007 | Asai et al. |
| 2007/0283220 A1 | 12/2007 | Kim |
| 2007/0296625 A1 | 12/2007 | Bruzzone et al. |
| 2008/0037801 A1 | 2/2008 | Alves et al. |
| 2008/0075189 A1 | 3/2008 | Li et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0144852 A1 | 6/2008 | Rebandt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2008/0279122 A1 | 11/2008 | Fukuda et al. |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0180404 A1 | 7/2009 | Jung et al. |
| 2009/0186582 A1 | 7/2009 | Muhammad et al. |
| 2009/0213770 A1 | 8/2009 | Mu |
| 2009/0221231 A1 | 9/2009 | Murch et al. |
| 2009/0262852 A1 | 10/2009 | Orlik et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Ahn et al. |
| 2010/0117693 A1 | 5/2010 | Buer et al. |
| 2010/0136900 A1 | 6/2010 | Seki |
| 2010/0150033 A1 | 6/2010 | Zinser et al. |
| 2010/0150070 A1 | 6/2010 | Chae et al. |
| 2010/0159837 A1 | 6/2010 | Dent et al. |
| 2010/0159858 A1 | 6/2010 | Dent et al. |
| 2010/0165895 A1 | 7/2010 | Elahi et al. |
| 2010/0208854 A1 | 8/2010 | Guess et al. |
| 2010/0215124 A1 | 8/2010 | Zeong et al. |
| 2010/0226356 A1 | 9/2010 | Sarin et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0266057 A1 | 10/2010 | Shrivastava et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0013735 A1 | 1/2011 | Huang et al. |
| 2011/0026509 A1 | 2/2011 | Tanaka |
| 2011/0081880 A1 | 4/2011 | Ahn |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0227664 A1 | 9/2011 | Wyville |
| 2011/0243202 A1 | 10/2011 | Lakkis |
| 2011/0250858 A1 | 10/2011 | Jain et al. |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0052892 A1 | 3/2012 | Braithwaite |
| 2012/0063369 A1 | 3/2012 | Lin et al. |
| 2012/0063373 A1 | 3/2012 | Chincholi et al. |
| 2012/0115412 A1 | 5/2012 | Gainey et al. |
| 2012/0140685 A1 | 6/2012 | Lederer et al. |

(56) References Cited

U.S. PATENT DOCUMENTS

| | | |
|---|---|---|
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0044791 A1 | 2/2013 | Rimini et al. |
| 2013/0076433 A1 | 3/2013 | Fratti |
| 2013/0089009 A1 | 4/2013 | Li et al. |
| 2013/0102254 A1 | 4/2013 | Cyzs et al. |
| 2013/0114468 A1 | 5/2013 | Hui et al. |
| 2013/0120190 A1 | 5/2013 | McCune |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0207745 A1 | 8/2013 | Yun et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1 | 10/2013 | Liu et al. |
| 2013/0273871 A1 | 10/2013 | Kravets |
| 2013/0286903 A1 | 10/2013 | Khojastepour et al. |
| 2013/0294523 A1 | 11/2013 | Rossato et al. |
| 2013/0301487 A1 | 11/2013 | Khandani |
| 2013/0301488 A1 | 11/2013 | Hong et al. |
| 2013/0308717 A1 | 11/2013 | Maltsev et al. |
| 2013/0315211 A1 | 11/2013 | Balan et al. |
| 2014/0011461 A1 | 1/2014 | Bakalski et al. |
| 2014/0016515 A1 | 1/2014 | Jana et al. |
| 2014/0126437 A1 | 5/2014 | Patil et al. |
| 2014/0169236 A1 | 6/2014 | Choi et al. |
| 2014/0185533 A1 | 7/2014 | Haub |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0313946 A1 | 10/2014 | Azadet |
| 2014/0348018 A1 | 11/2014 | Bharadia et al. |
| 2014/0348032 A1 | 11/2014 | Hua et al. |
| 2014/0376416 A1 | 12/2014 | Choi |
| 2015/0009868 A1 | 1/2015 | Jana et al. |
| 2015/0049834 A1 | 2/2015 | Choi et al. |
| 2015/0078217 A1 | 3/2015 | Choi et al. |
| 2015/0139122 A1 | 5/2015 | Rimini et al. |
| 2015/0146765 A1 | 5/2015 | Moffatt et al. |
| 2015/0156003 A1 | 6/2015 | Khandani |
| 2015/0156004 A1 | 6/2015 | Khandani |
| 2015/0171903 A1 | 6/2015 | Mehlman et al. |
| 2015/0188646 A1 | 7/2015 | Bharadia et al. |
| 2015/0215937 A1 | 7/2015 | Khandani |
| 2015/0249444 A1 | 9/2015 | Shin et al. |
| 2015/0270865 A1 | 9/2015 | Polydoros et al. |
| 2015/0303984 A1 | 10/2015 | Braithwaite |
| 2016/0036582 A1 | 2/2016 | Jana et al. |
| 2016/0218769 A1 | 7/2016 | Chang et al. |
| 2016/0226653 A1 | 8/2016 | Bharadia et al. |
| 2016/0266245 A1 | 9/2016 | Bharadia et al. |
| 2016/0380799 A1 | 12/2016 | Chang et al. |
| 2017/0019190 A1 | 1/2017 | Pack et al. |
| 2017/0041165 A1 | 2/2017 | Cheng et al. |
| 2017/0104506 A1 | 4/2017 | Liu et al. |
| 2017/0141886 A1 | 5/2017 | Chung et al. |
| 2017/0179916 A1 | 6/2017 | Hahn et al. |
| 2017/0180160 A1 | 6/2017 | Moorti et al. |
| 2017/0187404 A1 | 6/2017 | Hahn et al. |
| 2018/0013466 A1 | 1/2018 | Kim et al. |
| 2019/0044555 A1* | 2/2019 | Hewavithana ............ H04L 5/14 |
| 2019/0312609 A1 | 10/2019 | Moorti et al. |

FOREIGN PATENT DOCUMENTS

| | | |
|---|---|---|
| EP | 0755141 A3 | 10/1998 |
| EP | 1959625 B1 | 2/2009 |
| EP | 2237434 A1 | 10/2010 |
| EP | 2267946 A2 | 12/2010 |
| JP | 2001196994 A | 7/2001 |
| JP | 2003148748 A | 5/2003 |
| JP | 2012021153 A | 2/2012 |
| RU | 2256985 C2 | 7/2005 |
| WO | 2013173250 A1 | 11/2013 |
| WO | 2013185106 A1 | 12/2013 |
| WO | 2014093916 A1 | 6/2014 |

OTHER PUBLICATIONS

Bharadia, "Full Duplex Backscatter," Proceeding s of the 12th ACM Workshop on Hot Topics in Networks, 7 pages, ACM, (2013).

Bindu et al., "Active microwave imaging for breast cancer detection," Progress in Electromagnetics Research, vol. 58:149-169, (2006).

Boyd, "Sequential Convex Programming." [Retrieved from the Internet Oct. 26, 2016:http://www.stanford.edu/class/ee364b/lectures/seq_slides.pdf].

Cavoukian, "Whole Body Imaging in Airport Scanners: Building in Privacy by Design," information and Privacy Commissioner of Ontario, Mar. 2009. [Retrieved from the Internet Oct. 25, 2016:https://www.ipc.on.ca/wp-content/uploads/ . . . /wholebodyimaging.pdf.

Duarte et al., "Experiment-driven Characterization of Full-Duplex Wireless Systems," (2011).[Retrieved from the Internet Oct. 25, 2016: https://arxiv.org/abs/1107.1276].

Ekanadham, "Continuous Basis Pursuit and Its Applications," PhD thesis, New York, NY, USA, AAI3456394, (2012).

Erceg et al., "TGn channel models," Tech. Rep. IEEE P802.11, Wireless LANs, Garden Grove, Calif., USA, (2004).

FDA, "Medical Imaging, "[Retrieved from the Internet Oct. 25, 2016: http://www.fda.gov/Radiation-EmittingProducts/RadiationEmittingProductsandProcedures/MedicalImaging/MedicalX-Rays/ucm115317.htm].

Fear et al., "Confocal Microwave Imaging for Breast Cancer Detection: Localization of Tumors in Three Dimensions," IEEE Transactions on Biomedical Engineering, 49(8):812-822, (2002).

Fleury et al., "Channel Parameter Estimation in Mobile Radio Environments Using the SAGE Algorithm," IEEE Journal on Selected Areas in Communications, 17(3):434-450, (1999).

Guo et al., "Microwave Imaging via Adaptive Beamforming Methods for Breast Cancer Detection," Progress in Electromagnetics Research, vol. 1, 350-353, (2005).

Hong et al., "Picasso: Flexible RF and Spectrum Slicing," In Proceedings of the ACM SIGCOMM 2012 conference on Applications, technologies, architectures, and protocols for computer communications, SIGCOMM '12, pp. 283-284, ACM, Helsinki, Finland, (2012).

International Search Report and Written Opinion of the ISA, dated May 13, 2019, for application No. PCT/US19/19910.

Italian National Research Council, "Dielectric Properties of Body Tissues." [Retrieved from the Internet Oct. 25, 2016: http://niremf.ifac.cnr.it/tissprop/].

Jain et al., Practical, Real-time, Full Duplex Wireless,"MobiCom '11, pp. 301-312, ACM, New York, NY, USA, (2011).".

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

Sundstrom et al., "Power Dissipation Bounds for High-Speed Nyquist Analog-to-Digital Converters," IEEE Transactions on Circuits and Systems: Regular Paper, 56(3):509-518, (2009).

Surowiec et al., "Dielectric Properties of Breast Carcinoma and the Surrounding Tissues," IEEE Transactions on Biomedical Engineering, 35(4):257-263, (1988).

Tibshirani, "Regression shrinkage and selection via the lasso," Journal of the Royal Statistical Society, Series B (Methodological), pp. 267-288 (1996).

Tse et al., "Fundamentals of Wireless Communications," Aug. 13, 2004. [Retrieved from the Internet Oct. 25, 2016: www.eeec.berkeley.edu/-dtse/main.pdf].

Wikipedia, "Star Trek Tricoder," [Retrieved from the Internet Ocotber 26, 2016: http://en.wikipedia.org/wiki/Tricorder].

(56) References Cited

OTHER PUBLICATIONS

Xiong et al., "ArrayTrack: A Fina-Grained Indoor Location System" In Proceedings of the 10th USENIX conference on Networed Systems Design and Implementation, nsdi '13, pp. 71-84, USENIX Association, Berkeley, CA, USA, (2013).

Zhang et al., "A novel method for microwave breast cancer detection," Progress in Electromagnetics Research, vol. 83: 413-434, (2008).

Hua, Yingbo, et al., "Full Duplex Radios", SIGOMM, Aug. 12-16, 2013, Hong Kong, China, Copyright 2013 ACM 978-1-4503-2056-6/6/13/08, 12 pages, Aug. 12, 2013.

Riihonen, Taneli, et al., "Mitigation of Loopback Self-Interference in Full-Duplex MIMO Relays", EEE Transactions on Signal Processing, vol. 59, No. 12, Dec. 1, 2011.

Shenghong, Li, et al., "Full-Duplex Wireless Communication Using Transmitter Output Based Echo Cancellation", EEE Globecom 2011, Dec. 5, 2011, Dec. 5, 2011.

Slepian, D., "Prolate spheroidal wave functions, Fourier analysis, and Uncertainty: The Discrete Case", Bell Syst. Tech. Journal vol. 57, No. 5, pp. 1371-1430, May-Jun. 1978.

\* cited by examiner

SYSTEMS AND METHODS FOR EFFICIENTLY-TRANSFORMED DIGITAL SELF-INTERFERENCE CANCELLATION

CROSS-REFERENCE TO RELATED APPLICATIONS

This application claims the benefit of U.S. Provisional Application Ser. No. 62/818,264, filed on 14 Mar. 2019, which is incorporated in its entirety by this reference.

TECHNICAL FIELD

This invention relates generally to the wireless communications field, and more specifically to new and useful systems and methods for efficiently transformed digital self-interference cancellation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference fall short in performance, particularly in frequency to time domain (and time to frequency domain) conversion. Thus, there is a need in the wireless communications field to create new and useful systems and methods for efficiently-transformed digital self-interference cancellation. This invention provides such new and useful systems and methods.

DESCRIPTION OF THE PREFERRED EMBODIMENTS

Figure 1:
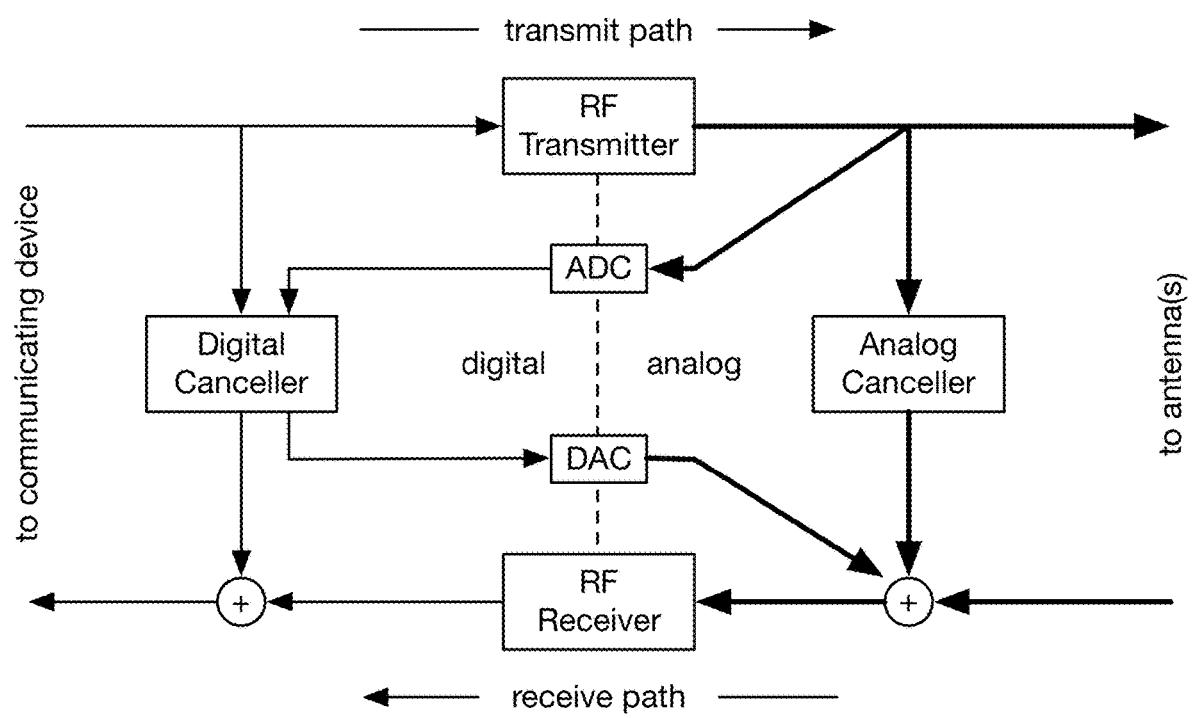
FIG. 1 is a schematic representation of a full-duplex transceiver.

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband analog signals, intermediate frequency (IF) analog signals, or as radio-frequency (RF) analog signals, but full-duplex transceivers may additionally or alternatively sample transmission output in any suitable manner. This sampled transmission output may be used by full-duplex transceivers to remove interference from received wireless communications data (e.g., as RF/IF/baseband analog signals or RF/IF/baseband digital signals). In many full-duplex transceivers, an analog self-interference cancellation system is paired with a digital self-interference cancellation system. The analog cancellation system removes a first portion of self-interference by summing delayed and scaled versions of the RF transmit signal to create an RF self-interference signal, which is then subtracted from the RF receive signal. Alternatively, the analog cancellation system may perform similar tasks at an intermediate frequency. After the RF (or IF) receive signal has the RF/IF self-interference signal subtracted, it passes through an analog-to-digital converter of the receiver (and becomes a digital receive signal). After this stage, a digital self-interference cancellation signal (created by transforming a digital transmit signal) is then subtracted from the digital receive signal.

Full-duplex transceivers often include tuning systems that adjust tunable parameters of the analog self-interference cancellation system in order to adapt the analog self-interference cancellation signal to changing self-interference conditions. Likewise, full-duplex transceivers may similarly include tuning systems that alter the transform configuration of digital self-interference cancellation systems for the same purpose.

Well-tuned digital and analog self-interference cancellation systems are generally effective for reducing interference, but tuning in these systems is often a time-consuming process. This poses a problem: the longer a system takes to retune, the more likely it is that the system will be unable to adapt to rapidly changing self-interference characteristics. Consequently, the usefulness of full-duplex transceivers may be limited.

In particular, one of the factors that may influence the time to tune a digital cancellation system involves the efficiency of time to frequency domain and frequency to time domain conversions (via Fourier transforms and inverse Fourier transforms respectively). The systems and methods described herein may increase tuning performance of full-duplex transceivers as shown in FIG. 1 (and other applicable systems) by more efficiently transforming signals from time to frequency domain and/or from frequency to time domains during digital self-interference canceller tuning, thus allowing for increased effectiveness in self-interference cancellation. Other applicable systems include active sensing systems (e.g., RADAR), wired communications systems, wireless communications systems, and/or any other suitable system, including communications systems where transmit and receive bands are close in frequency, but not overlapping.

2. Efficiently-Transformed Digital Self-Interference Canceller

Figure 2:
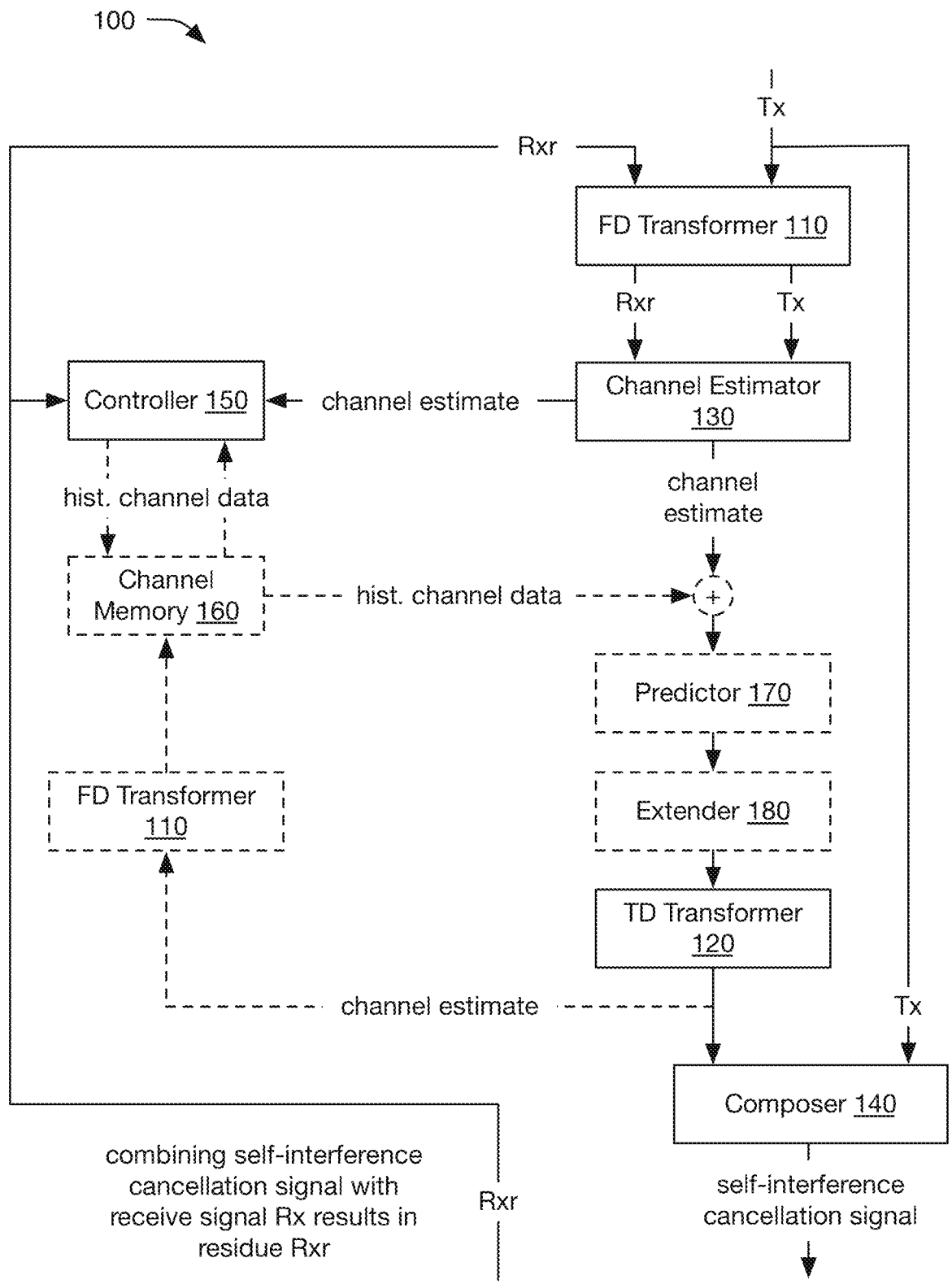
FIG. 2 is a schematic representation of a digital self-interference canceller of an invention embodiment.

An efficiently-transformed digital self-interference canceller 100 preferably includes an FD transformer 110, a TD transformer 120, a channel estimator 130, a composer 140, and a controller 150 (e.g., as shown in FIG. 2). The canceller 100 may additionally or alternatively include a channel memory 160, a predictor 170, and/or an extender 180. In some embodiments, the canceller 100 can include one or more elements such as described in U.S. patent application Ser. No. 16/718,447, filed 18 Dec. 2019 and titled "Systems and Methods for Intelligently-Tuned Digital Self-Interference Cancellation", which is herein incorporated in its entirety by this reference (e.g., one or more elements of the digital self-interference canceller 140 of U.S. patent application Ser. No. 16/718,447, such as the filter 142, channel estimator 143, controller 144, channel memory 145, transformer 141, predictor 146, and/or extender 147, etc.).

The canceller 100 functions to produce a digital self-interference cancellation signal from a digital transmit signal. More specifically, the FD transformer 110 transforms transmit (Tx) and residue (Rxr) signals from the time domain to the frequency domain. In the frequency domain, the channel estimator 130 generates an estimate of a self-interference channel from these signals. This channel estimate (after modification by the channel memory 160, predictor 170, and/or extender 180 if applicable) is transformed back into the time domain by the TD transformer 120. Finally, the time-domain self-interference channel is applied to the digital transmit signal by the composer 140 to generate a digital self-interference cancellation signal, which can then be combined with one or more receive signals to reduce self-interference present in those signals.

The FD transformer 110 and/or TD transformer 120 preferably utilize novel architectures that increase the efficiency of domain transformation, in turn increasing the performance of the digital self-interference canceller 100 (these techniques are discussed in more detail in later sections). Here, increased performance may be found in faster tuning time, lower computation resource usage (e.g., processor time, memory), and/or more accuracy in self-interference channel estimation.

The canceller 100 is preferably implemented using digital circuitry. Digital circuitry is preferably implemented using a general-purpose processor, a digital signal processor, an application specific integrated circuit (ASIC), a field programmable gate array (FPGA) and/or any suitable processor(s) or circuit(s), but may additionally or alternatively be implemented in any manner.

The canceller 100 may source input signals (e.g., a digital transmit signal) from any source (e.g., a digital signal directly from a communication device prior to digital-to-analog conversion, or a digital signal converted from a sampled analog transmit signal after digital-to-analog conversion). Likewise, the output of the canceller 100 may be combined with a receive signal (resulting in a residue signal) in any manner (e.g., the digital self-interference cancellation signal may be combined with a digital receive signal, or the digital self-interference cancellation signal may be converted to analog and combined with an analog receive signal).

The frequency domain (FD) transformer 110 functions to transform signals (e.g., a channel estimate, a digital transmit signal, a digital residue signal, etc.) from a time domain to a frequency domain (via a Fourier transform). The FD transformer 110 preferably utilizes an implementation of the Fast Fourier Transform (FFT) algorithm (note that the FFT algorithm is used to compute the discrete Fourier transform, or DFT, of a sequence), but may additionally or alternatively utilize any Fourier transform technique.

The canceller 100 may utilize FD transformers 110 of different configuration for different purposes. For example, the canceller 100 preferably includes a first FD transformer 110 that converts the transmit signal (Tx) and residue (Rxr) from the time domain to the frequency domain (so that channel estimation may be performed within the frequency domain). This FD transformer 110 may perform a standard FFT calculation based on the sample rate of the transmit signal (e.g., a 3750 point FFT may be used for a sample rate of 56.25 MHz, corresponding to 3750 samples per OFDM symbol of a signal). Alternatively, this FD transformer 110 may function in any manner.

The canceller 100 may additionally include a second FD transformer 110 used to convert a self-interference channel estimate (or other signal) generated by the canceller 100 back to the frequency domain from the time domain (e.g., for storage by the channel memory 160). This second FD transformer 110 is preferably configured based on the configuration of the TD transformer 120 (and is discussed in further detail after the description of the TD transformer 120), but may alternatively be configured in any manner.

Likewise, the time domain (TD) transformer 120 functions to transform signals (e.g., a self-interference channel estimate) from the frequency domain to a time domain (via an inverse Fourier transform). The TD transformer 120 preferably utilizes an implementation of the Inverse Fast Fourier Transform (IFFT) algorithm (note that here the IFFT algorithm is used to compute the inverse discrete Fourier transform, or IDFT, of a sequence), but may additionally or alternatively utilize any Fourier transform technique. As with the FD transformer 110, the canceller 100 may utilize TD transformers 120 of different configuration for different purposes.

Figure 3:
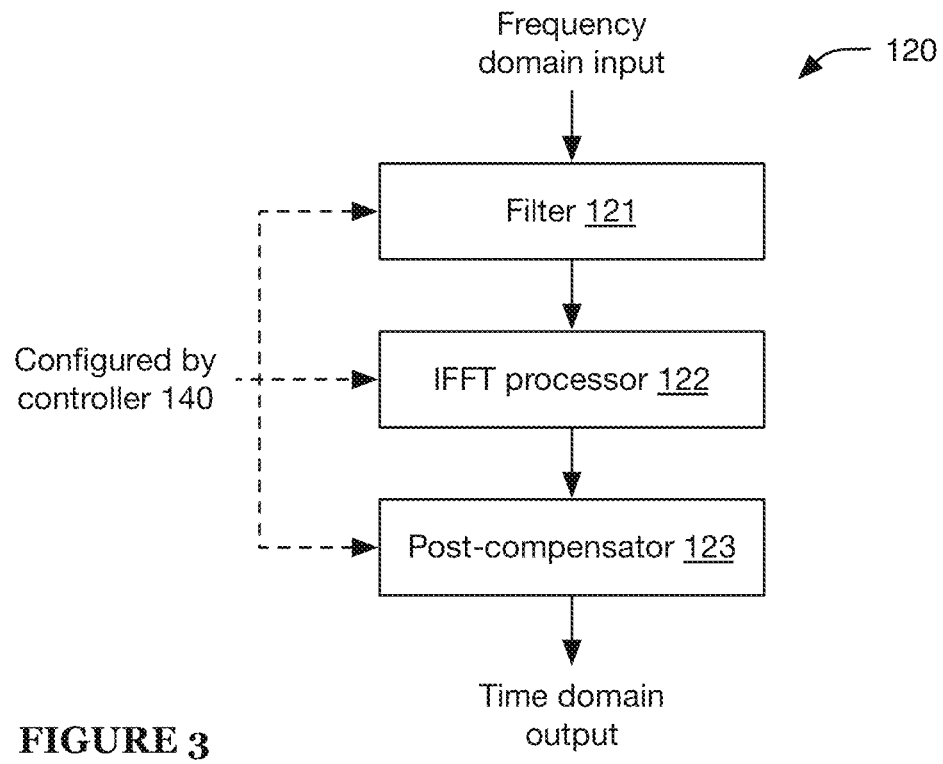
FIG. 3 is a schematic representation of a time domain transformer of a digital self-interference canceller of an invention embodiment.

The canceller 100 preferably includes a TD transformer 120 that converts the frequency-domain self-interference channel estimate generated by the channel estimator 130 to the time domain. In one implementation of an invention embodiment, this TD transformer 120 includes a filter 121, an IFFT processor 122, and a post-compensator 123, as shown in FIG. 3.

The filter 121 functions to downsample the frequency-domain signal as well as filter the frequency-domain signal (using an anti-aliasing filter). The filter 121 is preferably a decimating filter, but can additionally or alternatively function to downsample the frequency-domain signal in any other suitable manner. The filter 121 is preferably a finite impulse response (FIR) filter, but can additionally or alternatively include one or more infinite impulse response (IIR) filters and/or any other suitable filters. The filter 121 preferably performs these tasks using a single filter but may additionally or alternatively perform these tasks in any manner. For example, the filter 121 may be a decimating FIR low-pass filter.

The filter 121 can define a window function, preferably wherein application of the filter to a signal in the frequency domain is analogous to multiplying or convolving the window function with the signal in the time domain (e.g., wherein the signal is transformed into the time domain, then multiplied or convolved with the window function). The window function preferably defines a substantially limited time range (e.g., such that the window function overlaps all or substantially all of the amplitude or energy of a single period of a periodic time domain signal and/or overlaps none or substantially none of the amplitude or energy of all other periods of the time domain signal) and preferably concentrates a large portion (e.g., more than a threshold amount such as more than 50, 60, 70, 80, 90, 95, or 99%) of its frequency domain response within a finite range, such as within the range defined by the frequency domain taps of the filter. In some examples, the window function is associated with (e.g., composed of) one or more discrete prolate spheroidal functions (e.g., is equal to one such function or a linear combination of such functions). However, the filter can additionally or alternatively define any other suitable window function(s).

The filter 121 is preferably configured by the controller 150, but may additionally or alternatively be configured in any manner. Configuration for the filter may include, for example, filter size, filter coefficients, and/or decimation factor. For example, for a set of 1200 self-interference channel samples (e.g., corresponding to the number of active subcarriers for the OFDM symbol) the filter 121 may be configured as a 120 tap filter with a decimation factor of 30 (resulting in 40 filtered samples).

The decimation factor is preferably greater than or equal to a threshold number (e.g., 2, 3, 4, 5, 6-10, 10-20, 20-50, 50-100, 100-300, or greater than 300), but can alternatively be any other suitable factor. In examples in which the IFFT processor implements a multi-stage processing structure (e.g., multi-stage butterfly structure), the decimation factor is preferably comparable or larger than a metric associated with the scale of progression between stages, such as sufficiently large to eliminate one or more of the stages (as compared with an analogous IFFT process implemented on an un-decimated input signal). For example, the decimation factor can be substantially comparable to, equal to, or greater than a metric associated with the butterfly structure, such as a radix, a power of the radix (e.g., square, cube, fourth power, etc.), a product of multiple different radixes, or any other suitable metric.

The IFFT processor 122 functions to perform the inverse Fourier transform on the filtered samples. The filtered samples can optionally be rearranged and/or zero-padded (e.g., to increase the total number of input values to match the desired input size for the IFFT, preferably by padding with a number of zeros equal to the difference between the number of filtered samples and the number of IFFT inputs). In some embodiments, the IFFT processor implements an IFFT butterfly structure. The IFFT butterfly structure preferably defines a plurality of stages, wherein each stage defines a radix. The radixes of the stages are preferably equal, but some or all such radixes can alternatively differ. The IFFT butterfly structure can be the same as or different from the FFT butterfly structure described below. In examples, the IFFT butterfly structure can define 2, 3, 4, 5, 6-10, or more than 10 stages, and the stages can define radixes of 2, 3, 4, 5, 6-10, or more than 10.

The IFFT is preferably able to operate at a lower dimensionality (e.g., making it more computationally and memory efficient), such as due to the downsampling performed by the filter 121. For example, in the previous example (where the OFDM symbol comprised 3750 samples and 1200 active subcarriers and the filter 121 generated 40 filtered samples), the IFFT processor 122 may perform a 125 sample IFFT on the 40 samples (note that to perform this, the 40 filtered samples are padded by the IFFT processor 122 with 85 zeros). The result of processing by the IFFT processor 122 is a set of time domain self-interference channel samples (in the case of the 125 sample IFFT, 125). In a specific example, in which the IFFT processor implements an IFFT butterfly structure to achieve the 125 sample transformation, the IFFT butterfly structure defines 3 stages, each of radix 5. However, the IFFT processor 122 can additionally or alternatively implement any other suitable IFFT processes in any suitable manner.

The IFFT processor can be configured by the controller 150, but can additionally or alternatively be configured in any other suitable manner. Configuration for the IFFT processor can include, for example, input and/or output size (e.g., dimensionality), number of stages, radix of each stage, and/or twiddle factors.

The post-compensator 123 can function to further process the output of the IFFT processor 122. The post-compensator 123 preferably corrects for distortion in the time domain self-interference channel samples resulting from the fact that the filter 121 may impose a non-flat time domain response (e.g., time domain response associated with the window function of the filter 121). The post-compensator 123 preferably does this by multiplying each time-domain channel sample by the reciprocal of the time domain response of the filter 121, but may additionally or alternatively correct for the non-flat time domain response of the filter 121 in any manner. Note that in some cases, the post-compensator 123 may perform this post-compensation only for a subset of the time-domain channel samples. For example, if it is determined that only a certain number of time-domain channel samples are needed to effectively model the self-interference channel, the post-compensator 123 may perform compensation for only a subset of the time-domain channel samples (e.g., a window of consecutive samples, such as the first, last, or central window of a desired size and/or any other suitable window; a subset of non-consecutive samples, such as every other sample, every third sample, or any other suitable regular or non-regular subsampling; etc.). For example, it may be determined that 64 time-domain channel samples is adequate; in this case, the post-compensator 123 may perform compensation for only 64 of the 125 time-domain channel samples (e.g., the first 64 samples). In such in an implementation, the post-compensator 123 may likewise output only the subset of channel samples deemed relevant to self-interference cancellation (e.g., the 64 for which post-compensation were produced).

The post-compensator 123 can be configured by the controller 150, but can additionally or alternatively be configured in any other suitable manner. Configuration for the post-compensator preferably includes compensation coefficients, but can additionally or alternatively include any other suitable configuration information.

The structure of the TD transformer 120 can provide inherent benefits over other approaches for cases where the frequency domain sample size differs largely from the desired number of time-domain channel estimates (such as in the discussed example, where 64 time-domain channel samples are generated from 1200 frequency-domain samples). While the filter 121 typically adds computational complexity, nevertheless, the combination of the filter 121 and the reduced size FFT performed by the IFFT processor 122 may result in substantial computational efficiency over an approach such as simply performing the IFFT on the 1200 samples (e.g., via matrix multiply with a 64×1200 matrix).

Additionally or alternatively, the structure of the TD transformer 120 can provide more flexibility than many other approaches. For example, if it is determined that 96 time-domain channel estimates are desired to model the self-interference channel, the matrix approach requires that the IFFT matrix be completely re-calculated. In contrast, such a change with this structure requires only that the post-compensator 123 be modified to perform post-compensation for 96 samples instead of 64 (additionally, coefficients of the filter 121 may be slightly modified), while the IFFT processor 122 may continue to be used without modification. This enables changes in configuration with substantially less computational overhead (and allows more flexibility to perform in different configurations on the same hardware). Likewise, sampling rate changes can be accomplished without modifying or recalculating values of the IFFT processor 122.

As previously mentioned, in some implementations of the canceller 100, the canceller 100 may include a second FD transformer 110 used to convert a time-domain self-interference channel estimate back to the frequency domain (e.g., to store in channel memory 160). One reason that this may be done (e.g., as opposed to, or in addition to, simply storing the channel estimate immediately after generation, while still in the frequency domain) is that the conversion to the time domain may smooth and/or reduce noise in the self-interference channel estimate.

Figure 4:
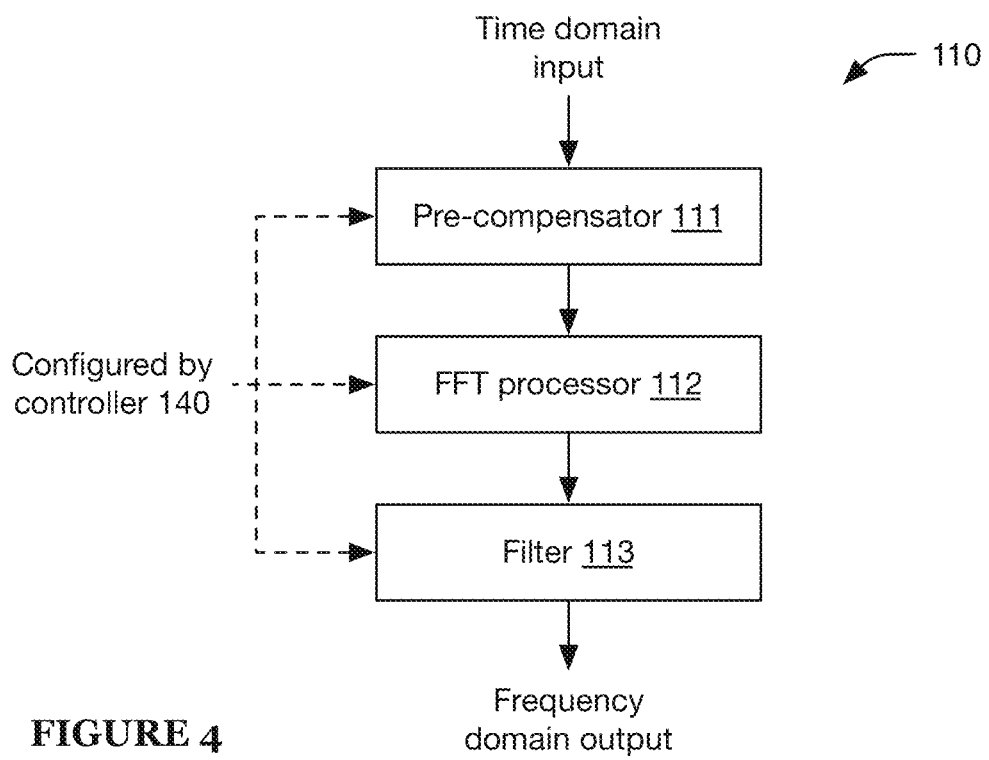
FIG. 4 is a schematic representation of a frequency domain transformer of a digital self-interference canceller of an invention embodiment.

In one implementation of an invention embodiment, this FD transformer 110 preferably includes a pre-compensator 111, an FFT processor 112, and/or a filter 113 (e.g., as shown in FIG. 4).

The pre-compensator 111 can function to distort the time-domain input to the FD transformer 110 to mitigate later distortion by the filter 113 (which, similar to the filter 121, may have a non-flat time domain response, such as a response defined by the window function of the filter 113 described below). The pre-compensator 111 performs this mitigation by multiplying each time-domain channel sample by the reciprocal of the time domain response of the filter 113, but may additionally or alternatively correct for the non-flat time domain response of the filter 113 in any manner.

The pre-compensator 111 can be configured by the controller 150, but can additionally or alternatively be configured in any other suitable manner. Configuration for the pre-compensator preferably includes compensation coefficients, but can additionally or alternatively include any other suitable configuration information.

The FFT processor 112 functions to perform the Fourier transform on the pre-compensated samples. In some embodiments, the FFT processor implements an FFT butterfly structure. The FFT butterfly structure preferably defines a plurality of stages, wherein each stage defines a radix. The radixes of the stages are preferably equal, but some or all such radixes can alternatively differ. The FFT butterfly structure can be the same as or different from the IFFT butterfly structure described above. In examples, the butterfly structure can define 2, 3, 4, 5, 6-10, or more than 10 stages, and the stages can define radixes of 2, 3, 4, 5, 6-10, or more than 10.

Low dimensionality of the input to the FFT processor 112 (and/or low dimensionality required of the output, such as low dimensionality enabled by later upsampling, preferably upsampling performed by the filter 113) can enable more efficient operation of the FFT processor 112 than in embodiments with greater dimensionality. For example, the FFT processor 112 may perform a 125 sample FFT on 64 time-domain channel estimate samples (e.g., zero-padded with 61 zeros), resulting in 125 frequency-domain channel estimate samples. In a specific example, in which the FFT processor implements an FFT butterfly structure to achieve the 125 sample transformation, the FFT butterfly structure defines 3 stages, each of radix 5. However, the FFT processor 112 can additionally or alternatively implement any other suitable FFT processes in any suitable manner.

The FFT processor can be configured by the controller 150, but can additionally or alternatively be configured in any other suitable manner. Configuration for the FFT processor can include, for example, input and/or output size (e.g., dimensionality), number of stages, radix of each stage, and/or twiddle factors.

The filter 113 preferably functions to upsample the frequency-domain signal and/or filter the frequency-domain signal (e.g., using an interpolating filter), more preferably performing both upsampling and filtering. The filter 113 is preferably a FIR filter, but can additionally or alternatively include one or more IIR filters and/or any other suitable filters. The filter 113 preferably performs these tasks using a single filter, but may additionally or alternatively perform these tasks in any manner. For example, the filter 113 may be a upsampling FIR interpolating filter. As described above regarding the filter 121, the filter 113 can define a window function (e.g., the same or substantially the same window function as the window function of the filter 121, a substantially different window function, etc.). In some examples, the window function is associated with (e.g., composed of) one or more discrete prolate spheroidal functions (e.g., is equal to one such function or a linear combination of such functions). However, the filter can additionally or alternatively define any other suitable window function(s).

The filter 113 is preferably configured by the controller 150, but may additionally or alternatively be configured in any manner. Configuration for the filter may include, for example, filter size, filter coefficients, and/or upsampling factor. For example, the filter 113 may take 125 outputs of the FFT processor 112, upsample by a factor of 30, and interpolate in the frequency domain to produce a total of 3750 self-interference channel samples (1200 of which correspond to active subcarriers).

The upsampling factor is preferably greater than or equal to a threshold number (e.g., 2, 3, 4, 5, 6-10, 10-20, 20-50, 50-100, 100-300, or greater than 300), but can alternatively be any other suitable factor. The upsampling factor is preferably comparable to (e.g., equal to, substantially equal to, etc.) the decimation factor of the filter 121, but can alternatively be substantially greater than the decimation factor, substantially less than the decimation factor, or have any other suitable value. In examples in which the FFT processor implements a multi-stage processing structure (e.g., multi-stage butterfly structure), the upsampling factor is preferably comparable or larger than a metric associated with the scale of progression between stages, such as sufficiently large to eliminate one or more of the stages (as compared with an analogous FFT process implemented to produce an output signal of the same size as the upsampled signal). For example, the upsampling factor can be substantially comparable to, equal to, or greater than a metric associated with the butterfly structure, such as a radix, a power of the radix (e.g., square, cube, fourth power, etc.), a product of multiple different radixes, or any other suitable metric.

The structure of the FD transformer 110 may enhance inherent performance and/or flexibility (e.g., in similar ways as the TD transformer 120). In embodiments, adjustments either to sampling rate or number of time-domain self-interference cancellation samples may be modified without modifying or recalculating parameters for the FFT transformer 112 (e.g., as with the TD transformer 120).

The canceller 100 may additionally or alternatively include any other transformers that transform signals into an alternate-basis representation to perform some function (generally, to calculate the self-interference channel before transforming the channel back into the original representation).

The channel estimator 130 preferably functions to generate a current self-interference cancellation channel estimate (A) from a suitable signal source. The channel estimator 130 preferably generates the self-interference channel estimate from a ratio of residue and transmit signals (e.g., Rxr/Tx) but may additionally or alternatively generate self-interference channel estimates from any signal data.

The channel estimator 130 preferably generates a channel estimate from a weighted sum of signal components according to mathematical models adapted to model self-interference contributions of the RF transmitter, RF receiver, and/or other sources. Examples of mathematical models that may be used by the channel estimator 130 include generalized memory polynomial (GMP) models, Volterra models, and Wiener-Hammerstein models; the channel estimator 130 may additionally or alternatively use any combination or set of models.

The channel estimator 130 may additionally or alternatively use generated mathematical models for modeling self-interference contributions based on comparisons of sampled digital transmit signals to received signals (from the receive path or any other suitable source). These models may be generated from previously known models or may be created using neural network and/or machine learning techniques.

The channel estimator 130 preferably performs channel estimate generation according to a transform configuration set dynamically by the controller 150 (discussed in more detail in sections covering the controller 150). Additionally or alternatively, the channel estimator 130 may combine signal components in any manner in order to generate a self-interference channel estimate.

In some embodiments, the channel estimator 130 may perform filtering for signals processed by the estimator 130. For example, the estimator 130 may reduce input noise by performing time-averaging of input signals to prepare the signals for self-interference cancellation signal generation. The estimator 130 may perform time-averaging in any manner; e.g., block averaging, moving averaging, infinite impulse response (IIR) filtering, etc.

Input signals may include transmit signals (Tx), receive signals (Rx), or any other signals (e.g., a ratio of Tx to Rx). Note that Rx may be written as follows: Rx=TxH+Z, where H is the self-interference channel, and Z is noise (which includes an actual receive signal if present). Likewise, the residue signal after digital self-interference cancellation may be written as Rxr=Tx(H−Ĥ)+Z, where A is a self-interference channel estimate and −TxĤ represents a self-interference cancellation signal.

Time averaging functions to reduce the effect of noise in channel estimates (e.g., as Z varies independent of H). As discussed in later sections, the controller 150 preferably dynamically adjusts the number of samples the estimator 130 uses to perform averaging (i.e., the averaging window) to improve canceller 100 performance. Larger sampling windows allow for increased immunity to noise, but at the cost of ability to track rapid self-interference channel variation. The controller 150 may additionally or alternatively vary any aspect of filtering.

The estimator 130 may additionally or alternatively perform any signal transformation to aid in preparing input signals for self-interference cancellation. For example, the estimator 130 may perform sample rate conversion of signals, scaling, shifting, and/or otherwise modifying signals.

In one implementation, the estimator 130 modifies sampled digital transmit signals by removing information unlikely to substantially affect the output of the estimator 130. This may include, for instance, dropping samples if the samples do not represent a change above some change threshold from previous samples. As another example, if digital transmit signals correspond to a particular amplitude of an output analog signal, only digital signal data corresponding to an amplitude above some amplitude threshold may be used by the estimator 130 in generating channel estimates.

If the estimator 130 receives digital transmit signals from more than one source (e.g. from both the digital transmit line before the RF transmitter and the analog transmit line after the RF transmitter via an ADC), the estimator 130 may additionally or alternatively combine the signals in any suitable way or may select one signal over another. For instance, the estimator 130 may base channel estimates on the average of the two signals. As another example, the estimator 130 may prefer an RF-sourced digital transmit signal over the transmit-path digital transmit signal (e.g., sampled before conversion by the transmitter) above a certain transmitter power, and vice versa at or below that transmitter power. The selection and combination of the two (or more) signals may be dependent on any suitable condition.

The estimator 130 preferably uses both the digital transmit signal and the digital residue (i.e., the digital receive signal after the digital receive signal has been combined with the digital self-interference cancellation signal output by the canceller 100) to generate self-interference channel estimates but may additionally or alternatively use any signals (e.g., a combination of transmit and residue, receive signal prior to combination with self-interference cancellation signal, etc.). The digital transmit signal after filtering may be referred to as a reduced-noise digital transmit signal; likewise, if the residue is filtered, it may be referred to as a reduced-noise residue signal.

The canceller 100 preferably includes a single channel estimator 130, but may additionally or alternatively include multiple channel estimators 130. For example, the digital self-interference canceller 100 may include one channel estimator 130 for linear self-interference cancellation and one for non-linear self-interference cancellation. Signal components may be transmitted to multiple channel estimators 130 in any manner. If the canceller 100 includes multiple channel estimators 130, the output of these filters may be combined in any manner to generate a self-interference cancellation signal.

The digital transform configuration preferably includes settings that dictate how the digital self-interference canceller 100 transforms the digital transmit signal to a digital self-interference signal (e.g. coefficients of a generalized memory polynomial used to transform the transmit signal to a self-interference signal).

The composer 140 preferably functions to generate a self-interference cancellation signal from the self-interference channel generated by the channel estimator 130 (optionally modified by the channel memory 160, predictor 170, and/or extender 180). The self-interference channel may be either in the frequency or time domains (or any other basis) and may be transformed any number of times by FD and/or TD transformers 110/120. The composer 140 preferably generates the self-interference cancellation signal using a finite impulse response (FIR) filter applied to a transmit signal (e.g., wherein the self-interference channel is used by the controller 150 to set the configuration of this filter). Additionally or alternatively, the composer 140 may generate a self-interference cancellation signal from the self-interference channel (and/or other output of the estimator 130) in any manner.

The controller 150 functions to set the transform configuration of the channel estimator 130 and to control configuration aspects of the FD transformer 110 and TD transformer 120. The controller 150 may additionally or alternatively set or modify any other configuration parameters of the canceller 100.

The transform configuration preferably includes the type of model or models used by the channel estimator 130 as well as configuration details pertaining to the models (each individual model is a model type paired with a particular set of configuration details). For example, one transform configuration might set the channel estimator 130 to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the channel estimator 130. For example, if the channel estimator 130 includes multiple transform paths, the controller 150 may set the number of these transform paths, which model order their respective component generators correspond to, and/or any other suitable details. In general, the transform configuration may include any details relating to the computation or structure of the channel estimator 130.

Transform configurations are preferably selected and/or generated by the controller 150. The controller 150 may set an appropriate transform configuration by selecting from stored static configurations, from generating configurations dynamically, or by any other suitable manner or combination of manners. For example, the controller 150 may choose from three static transform configurations based on their applicability to particular signal and/or environmental conditions (the first is appropriate for low transmitter power, the second for medium transmitter power, and the third for high transmitter power). As another example, the controller 150 may dynamically generate configurations based on signal and/or environmental conditions; the coefficients of a GMP model are set by a formula that takes transmitter power, temperature, and receiver power as input.

The controller 150 preferably sets transform configurations based on a variety of input data (whether transform configurations are selected from a set of static configurations or generated according to a formula or model). Input data used by the controller 150 may include static environmental and system data (e.g. receiver operating characteristics, transmitter operating characteristics, receiver elevation above sea-level), dynamic environmental and system data (e.g. current ambient temperature, current receiver temperature, average transmitter power, ambient humidity), and/or system configuration data (e.g. receiver/transmitter settings), signal data (e.g., digital transmit signal, RF transmit signal, RF receive signal, digital receive signal). The controller 150 may additionally or alternatively generate and/or use models based on this input data to set transform configurations; for example, a transmitter manufacturer may give a model to predict internal temperature of the transmitter based on transmitter power, and the controller 150 may use the output of this model (given transmitter power) as input data for setting transform configurations.

When utilizing digital residue signals, the controller 150 preferably utilizes an un-filtered digital residue signal (as shown in FIG. 2), but may additionally or alternatively utilize a filtered digital residue signal. Likewise, any input signal data used by the controller 150 may be in raw form, in processed form, or in any other form. The digital residue signal used by the controller may be referred to as a controller-sampled digital residue signal.

The controller 150 may set transform configurations at any time, but preferably sets transform configurations in response to either a time threshold or other input data threshold being crossed. For example, the controller 150 may re-set transform configurations every ten seconds according to changed input data values. As another example, the controller 150 may re-set transform configurations whenever transmitter power thresholds are crossed (e.g. whenever transmitter power increases by ten percent since the last transform configuration setting, or whenever transmitter power increases over some static value).

The controller 150 may cooperate with analog self-interference cancellers (for instance, setting transform configurations based on data from the analog canceller, coordinating transform configuration setting times with the analog canceller, disabling or modifying operation of the analog canceller) to reduce overall self-interference (or for any other suitable reason).

The controller 150 preferably adapts transform configurations and/or transform-configuration-generating algorithms (i.e., algorithms that dynamically generate transform configurations) to reduce self-interference for a given transmit signal and set of system/environmental conditions. The controller 150 may adapt transform configurations and/or transform-configuration-generating algorithms using analytical methods, online gradient-descent methods (e.g., LMS, RLMS), and/or any other suitable methods. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

The controller 150 may adapt transform configurations based on test input scenarios (e.g. scenarios when the signal received by the RF receiver is known), scenarios where there is no input (e.g. the only signal received at the RF receiver is the signal transmitted by the RF transmitter), or scenarios where the received signal is unknown. In cases where the received signal is an unknown signal, the controller 150 may adapt transform configurations based on historical received data (e.g. what the signal looked like ten seconds ago) or any other suitable information. The controller 150 may additionally or alternatively adapt transform configurations based on the content of the transmitted signal; for instance, if the transmitted signal is modulated in a particular way, the controller 150 may look for that same modulation in the self-interference signal; more specifically, the controller 150 may adapt transform configurations such that when the self-interference signal is combined with the digital receive signal the remaining modulation (as an indicator of self-interference) is reduced (compared to a previous transform configuration).

The controller 150 may additionally or alternatively function to set tuning parameters for components outside of the digital self-interference canceller 100, particularly if those parameters are relevant to digital self-interference canceller performance and/or tuning.

In addition to setting the transform configuration, the controller 150 may also be used to change other parameters surrounding digital self-interference cancellation. For example, the controller 150 may be used to modify the size of the averaging window (i.e., number of samples used to perform averaging) of a filter in response to estimated channel characteristics (e.g., channel power, channel dynamics).

The channel memory 160 functions to hold data relating to past self-interference channel estimates. In some use cases, it may be desired that the channel estimator 130 operate on only a subset of a full communication channel at a time. In many communication schemes, transmission may occur only some subchannels (of an overall full channel) at a given time. Accordingly, it may be possible (or desirable) only to update subchannels for which transmit signal data is available. In these use cases, the channel memory 160 may function to store the last known self-interference channel for each subchannel (or any other representation of the full self-interference channel) which may be combined with an incremental update generated by the channel estimator 130 to create a new full channel estimate. As shown in FIG. 2, this new full channel estimate is then sent to the channel memory 160, where it may be stored as the most recent self-interference channel estimate.

Note that as shown in FIG. 2, the channel estimate stored by the channel memory may be transformed before storage; however, additionally or alternatively the channel memory 160 may be updated directly from the combination of the channel memory 160 output and the channel estimator 130 output.

The digital self-interference canceller 100 may combine channel estimates from channel memory 160 with the output of the channel estimator 130 in any manner. For example, the digital self-interference canceller 100 may replace a section (e.g., a sub-band) of a past channel estimate with the output of the channel estimator 130. As a second example, the channel estimator 130 may average the output of the channel estimator 130 and the channel memory 160 within a sub-band of relevance.

The predictor 170 functions to predict a future self-interference cancellation channel estimate from current and/or past self-interference cancellation channel estimates. Because performing cancellation tuning requires non-zero time, any tuning on a varying self-interference channel is typically delayed. The predictor 170 preferably modifies the output of the channel estimator 130 to compensate for some or all of the delay incurred by the tuning process. Additionally or alternatively, the predictor 170 may predict future self-interference cancellation channels in order to increase time in between tuning for the canceler 100.

Figure 5A:
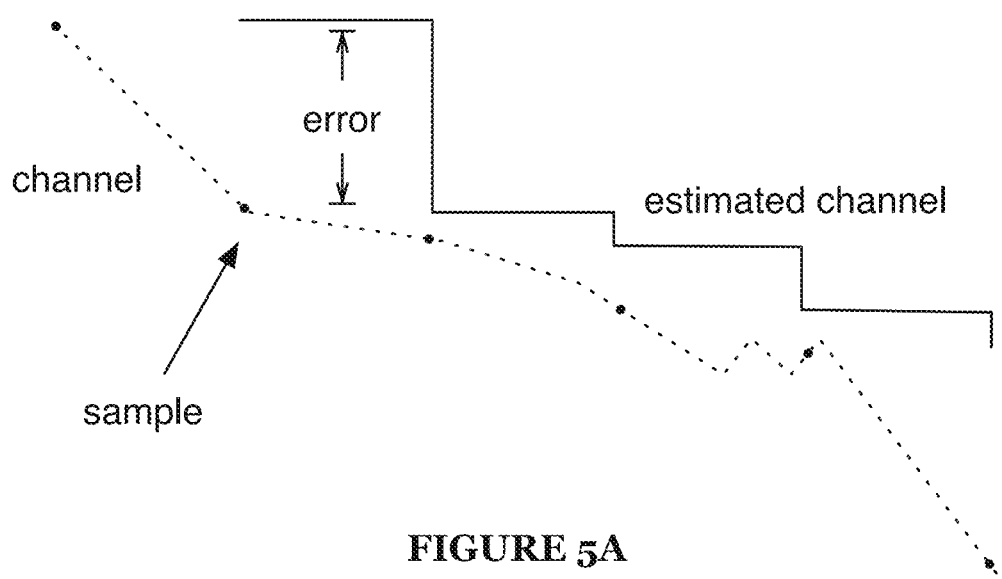
FIG. 5A is a plot representation of a self-interference channel estimate.
Figure 5B:
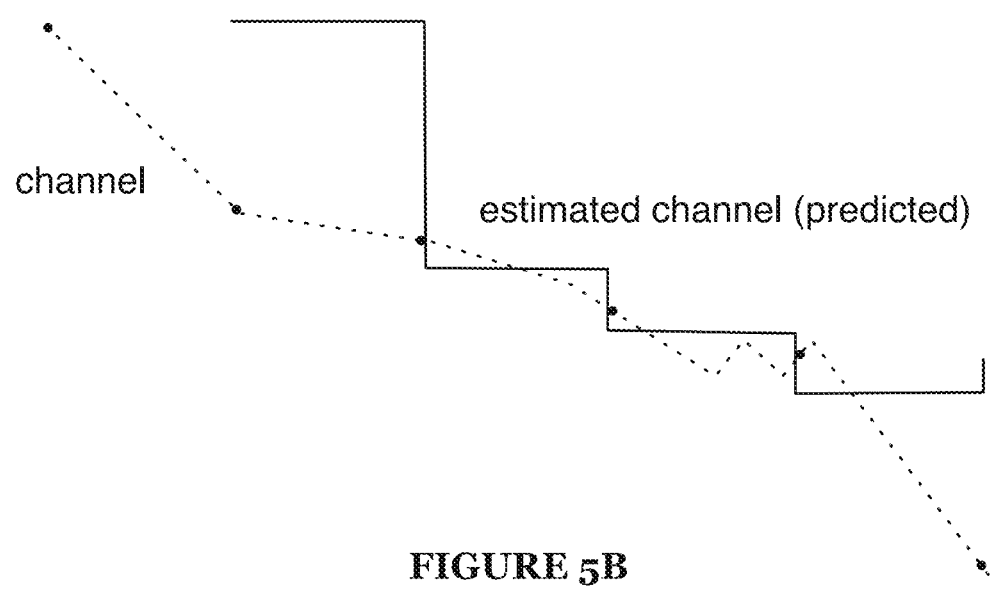
FIG. 5B is a plot representation of a predicted self-interference channel estimate.

For example, as shown in FIG. 5A, the estimated channel lags behind actual channel. The predictor 170 may modify the estimated channel based on past channel estimates, leading to a predicted channel, as shown in FIG. 5B. This may result in a significant reduction of error.

The predictor 170 may attempt to compensate for a known or estimated tuning delay (e.g., the delay between sampling a signal and estimating the self-interference channel from that signal), but may additionally or alternatively extrapolate the self-interference channel into the future by any amount of time (e.g., a time less than or greater than the aforementioned delay). Extrapolation may be performed using instantaneous time deltas, but may additionally or alternatively be performed using filtered time deltas (e.g., averaging measured time deltas). For example, using instantaneous time deltas, the predictor 170 may perform extrapolation for a given self-interference channel estimate based on the difference between the time at which the digital transmit signal and residue signal were sampled and the time that a channel estimate was generated. Likewise, using filtered time deltas, the predictor 170 may perform extrapolation based on the average of several such differences (e.g., the most recent three differences).

The predictor 170 preferably predicts self-interference channel data on a per-subcarrier (or per sub-band) basis (i.e., the self-interference channel of each subcarrier is predicted independently). Alternatively, the predictor 170 may jointly predict time and frequency variance of the self-interference channel (discussed in later sections).

The predictor 170 preferably performs linear extrapolation of the channel, but may additionally or alternatively perform any type of extrapolation (e.g., quadratic). The predictor 170 may additionally or alternatively perform signal prediction using any technique (e.g., Weiner filtering, MMSE prediction, adaptive filtering techniques such as LMS and RLS, or neural network/machine learning based techniques).

As previously discussed, the predictor 170 preferably performs prediction on a per sub-carrier basis. In many communication schemes (e.g., LTE), even during periods of activity, not every sub-carrier is scheduled every symbol. There are two primary consequences that pertain to the predictor 170. The first is that if a sub-carrier is not active, prediction may not be useful until that sub-carrier is active again. The second is that if a substantial amount of inactive time passes, the incremental self-interference channel for that sub-carrier is often not accurately represented by an extrapolation of stale data. Further, the presence of stale data may cause new channel estimates to converge slowly.

The predictor 170 preferably addresses these issues by tracking the activity of each subcarrier and managing predictor state (for each sub-carrier) based on this activity. The predictor 170 preferably monitors the most recent times when each sub-carrier was scheduled. In an implementation of an invention embodiment, when a sub-carrier is (or will be) inactive for a substantial time (i.e., a time greater than some threshold), the prediction for that sub-carrier is disabled. This is referred to as the RESET state. Additionally, the memory for that prediction may be cleared (preventing stale data from influencing later prediction). When the sub-carrier is active again, prediction is enabled in the WARMUP state. In this state, prediction begins estimating channel parameters (e.g., slope and offset), but does not yet modify the channel estimate based on these parameters. After satisfaction of the WARMUP state (e.g., by passing a time threshold, by reaching a threshold parameter convergence), prediction is enabled in the NOMINAL state (where prediction operates as normal). Alternatively, prediction output and state many be managed in any way. For example, prediction may be turned on for linear components of the self-interference channel, but disabled for higher order components of the self-interference channel.

Predicting channel estimates may have additional challenges when sub-carriers are not uniformly sampled in time. In an implementation of an invention embodiment, the predictor 170 scales differential values based on latched timestamps to compensate for non-uniform sampling.

Figure 6:
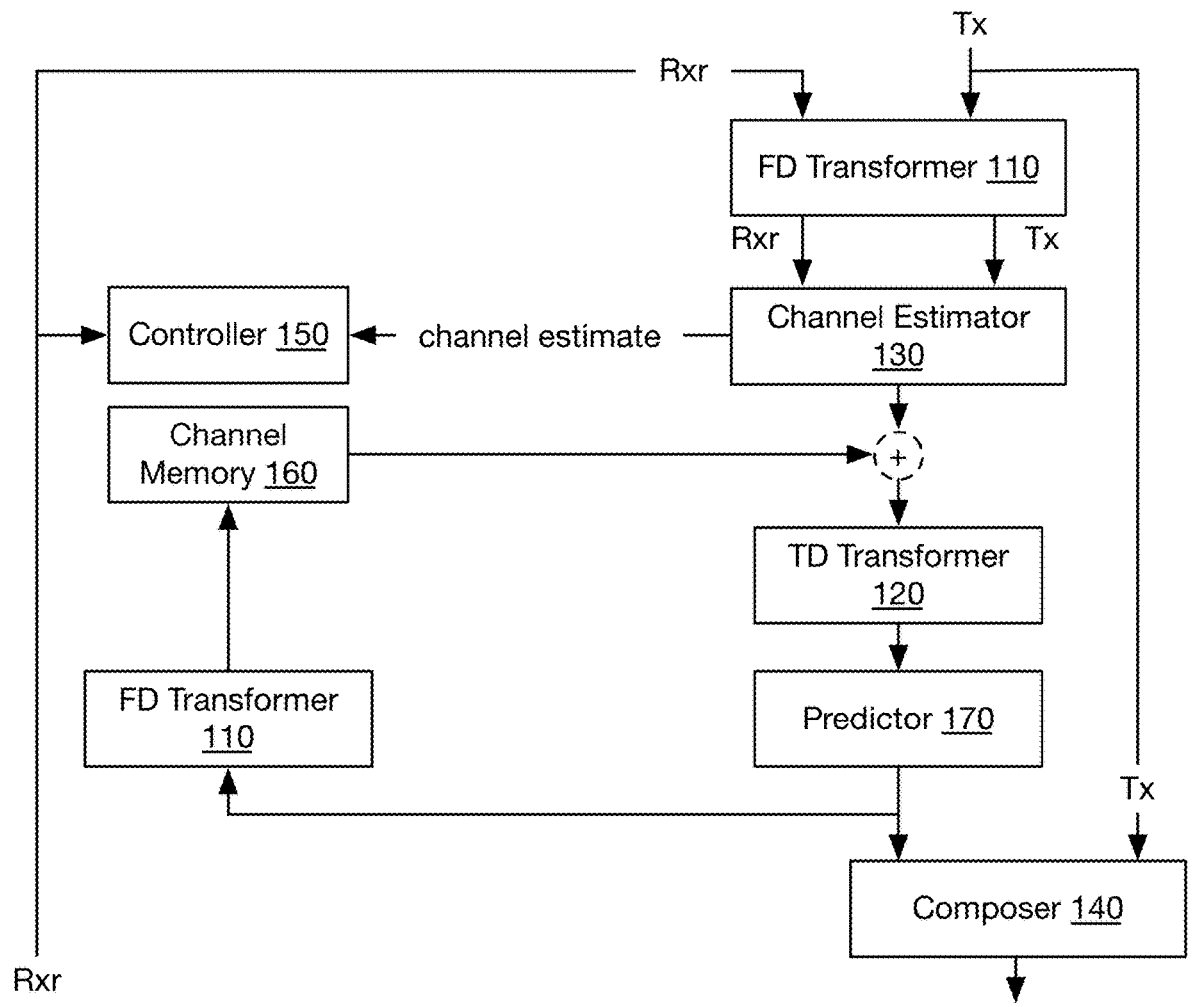
FIG. 6 is a schematic representation of a digital self-interference canceller of an invention embodiment.

The predictor 170 preferably performs prediction in the frequency domain, as shown in FIG. 2. Alternatively, the predictor 170 may perform prediction in the time domain, as shown in FIG. 6. This can reduce the complexity of prediction (because the time domain solution is generally smaller than the frequency domain solution), but may also diminish the ability to control for prediction on a sub-carrier basis.

Figure 7:
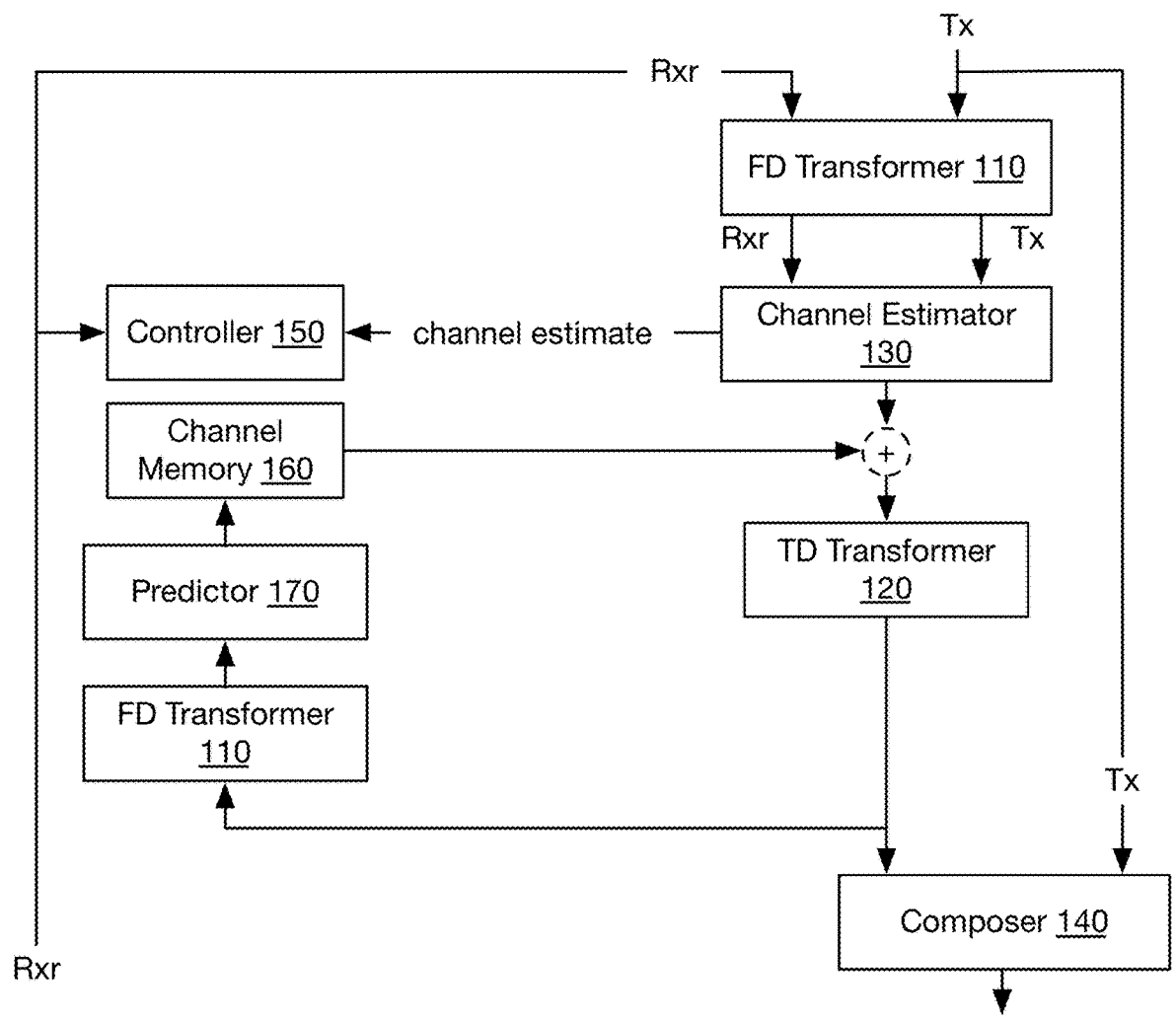
FIG. 7 is a schematic representation of a digital self-interference canceller of an invention embodiment.

As another alternative configuration, the predictor 170 may occur after the channel estimate has been converted to time domain and then back again to frequency domain (e.g., denoising), as shown in FIG. 7. While denoising leads to a cleaner prediction, it may also increase prediction complexity.

In a variation of an invention embodiment, the predictor 170 may extrapolate for a given subcarrier based not only on historical channel data for that subcarrier, but also for neighboring subcarriers. This may be particularly useful for communications systems where sub-carriers are scheduled intermittently.

The extender 180 functions to extend self-interference channel estimates to smooth estimate edges (e.g., if a self-interference channel is calculated for a particular band and zero outside of that band, there may be a discontinuity or sharp edge at the band edge). Edges or other rapidly-varying features may require a large number of components to accurately implement the channel estimate in the time domain (e.g., in the interference canceller 100). Thus, it may be desirable to smooth such features in the frequency domain representation of the self-interference channel prior to converting the channel estimate to a time domain representation, in order to simplify the time domain representation of the transform in the canceller 100.

In smoothing either the magnitude or phase response of the channel estimate in the frequency domain, it may be necessary for the extender 180 to identify and/or locate edges or other similarly abrupt changes and/or rapidly varying features. Various techniques may be used to locate the edges. A first such variation is to compute the local derivative of the response vs. frequency (e.g., using a finite-differencing scheme) at each frequency value of the response, and to consider an "edge" to be located at any frequency where the local derivative exceeds a particular threshold. Thus, a local slope that is sufficiently "steep" (i.e., has a sufficiently large first derivative) can be recognized as an edge or other feature in need of smoothing. A related variation includes computing the local first derivative only within frequency bands of the response where sharp variations are known to occur, in order to reduce the computation time of edge detection. In other variations, locating edges or other abrupt changes may include one or a combination of step detection algorithms, such as 0-degree spline fitting, piecewise constant denoising, and variational methods (e.g., the Potts model). Additionally or alternatively, abrupt changes in the responses requiring smoothing can be located in any other suitable manner.

Figure 8:
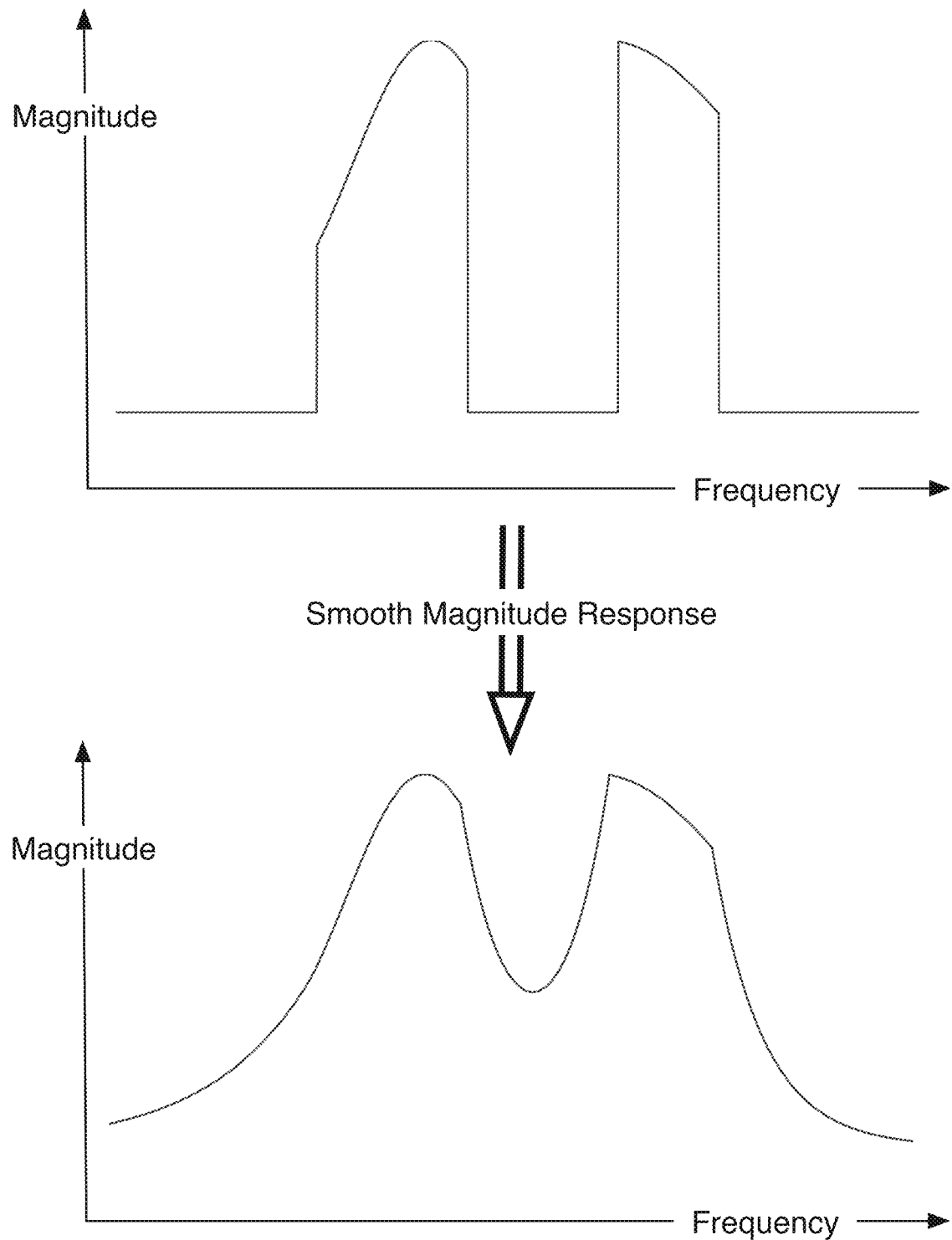
FIG. 8 is a plot representation of self-interference channel magnitude smoothing.

As shown in FIG. 8, the extender 180 preferably includes smoothing the magnitude response of a self-interference channel estimate. In this example, exponential decay functions are matched to edges (i.e., where the derivative of magnitude response vs. frequency exceeds a threshold) of the magnitude response. However, other functions may additionally or alternatively be matched to the edges of the magnitude response, such as a polynomial function, a cubic spline, or any other suitable smoothly varying function. The function used is preferably selected in order to minimize the number of components needed to represent the transform in the time domain, but can alternatively be selected for any suitable reason. The extender 180 may also extrapolate or otherwise modify magnitude response of an estimate in any manner, including performing curve fitting on portions of the magnitude response of an estimate. The extender 180 may also filter portions of the magnitude response of the estimate (e.g., median filtering, convolution filtering, and/or any other suitable smoothing filtering).

Figure 9:
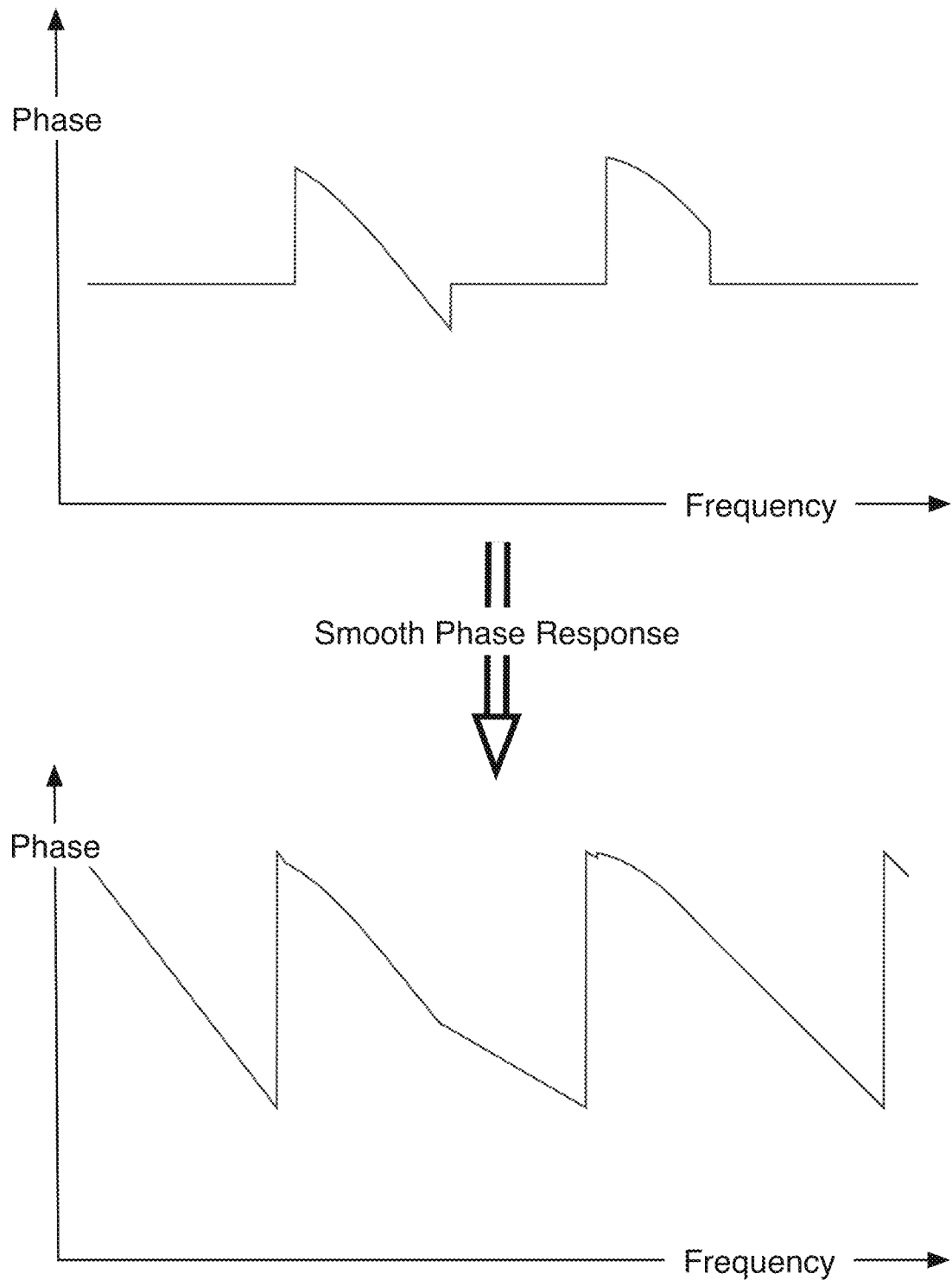
FIG. 9 is a plot representation of self-interference channel phase smoothing.

As shown in FIG. 9, the extender 180 preferably also smoothes the phase response of the transform. In this example, phase is extrapolated linearly between edges of phase response (i.e., where the derivative of phase response vs. frequency exceeds a threshold). The extender 180 may also extrapolate or otherwise modify phase response of an estimate in any manner, including performing curve fitting on portions of the phase response of an estimate. The extender 180 may also filter portions of the phase response of the estimate (e.g., median filtering, convolution filtering, and/or any other suitable smoothing filtering).

The digital self-interference canceller 100 may additionally or alternatively include any other components as described in U.S. patent application Ser. No. 15/362,289, e.g., blocker filters, filter inverters, etc. The digital self-interference canceller 100 may additionally or alternatively include gain/phase compensators that function to modify the gain and phase of either the digital receive signal or the digital self-interference cancellation signal such that the two signals are aligned in gain and phase. Gain/phase compensation thus enables the canceller 100 to compensate for gain and/or phase error induced by the receive chain (or other sources). Gain/phase correction values are preferably set by the controller 150, but may additionally or alternatively be set in any manner.

3. Self-Interference Cancellation System

Figure 10:
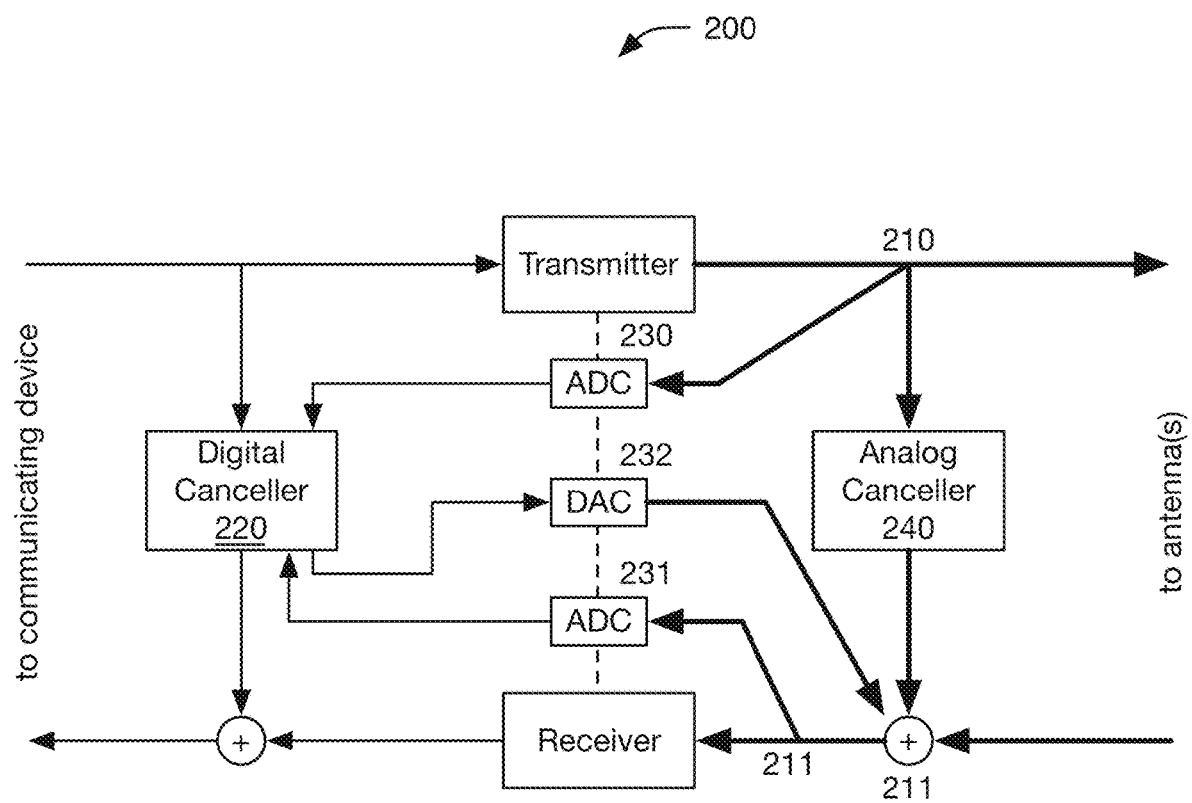
FIG. 10 is a schematic representation of a self-interference cancellation system of an invention embodiment.

As shown in FIG. 10, a system 200 utilizing efficiently transformed digital self-interference cancellation preferably includes a transmit coupler 210, a digital self-interference canceller 220, and a receive coupler 211. The system 200 may additionally or alternatively include analog-to-digital converters (ADCs) 230 and 231, digital-to-analog converters (DAC) 232, and/or an analog canceller 2400. In some embodiments, the system 200 can include one or more elements such as described in U.S. patent application Ser.

No. 16/718,447, filed 18 Dec. 2019 and titled "Systems and Methods for Intelligently-Tuned Digital Self-Interference Cancellation", which is herein incorporated in its entirety by this reference (e.g., one or more elements of the system 100 of U.S. patent application Ser. No. 16/718,447, such as the receiver 110, transmitter 120, signal coupler 130, ADCs 150, 151, DAC 152, and/or analog canceller 160, etc.).

The system 200 functions to perform self-interference cancellation utilizing an efficiently transformed digital self-interference canceller substantially similar to that of the canceller 100.

The system 200 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 200 preferably includes memory to store configuration data, but may additionally or alternatively be configured using externally stored configuration data or in any suitable manner.

The system 200 preferably is coupled to a receiver. The receiver functions to receive analog receive signals transmitted over a communications link (e.g., a wireless channel, a coaxial cable). The receiver preferably converts analog receive signals into digital receive signals for processing by a communications system, but may additionally or alternatively not convert analog receive signals (passing them through directly without conversion).

The receiver is preferably a radio-frequency (RF) receiver, but may additionally or alternatively be any suitable receiver. The receiver is preferably coupled to the communications link by a duplexer-coupled RF antenna, but may additionally or alternatively be coupled to the communications link in any suitable manner. Some examples of alternative couplings include coupling via one or more dedicated receive antennas. In another alternative coupling, the receiver may be coupled to the communications link by a circulator-coupled RF antenna.

The receiver preferably includes an analog-to-digital converter (ADC) and a frequency downconverter. The receiver may additionally include a low-noise amplifier. The receiver may additionally or alternatively include amplifiers, filters, signal processors and/or any other suitable components. In one variation of a preferred embodiment, the receiver includes only analog processing circuitry (e.g., amplifiers, filters, attenuators, delays). The receiver may function to scale, shift, and/or otherwise modify the receive signal. The downconverter functions to downconvert the analog receive signal from RF (or any other suitable frequency) to a baseband or IF analog receive signal, and the analog-to-digital converter (ADC) functions to convert the baseband or IF analog receive signal to a digital receive signal.

Likewise, the system 200 is preferably also coupled to a transmitter. The transmitter functions to transmit signals of the communications system over a communications link to a second communications system. The transmitter preferably converts digital transmit signals into analog transmit signals.

The transmitter is preferably a radio-frequency (RF) transmitter, but may additionally or alternatively be any suitable transmitter.

The transmitter is preferably coupled to the communications link by a duplexer-coupled RF antenna, but may additionally or alternatively be coupled to the communications link in any suitable manner. Some examples of alternative couplings include coupling via one or more dedicated transmitter antennas. In another alternative coupling, the transmitter may be coupled to the communications link by a circulator-coupled RF antenna.

The transmitter preferably includes a digital-to-analog converter (DAC) and a frequency upconverter. The transmitter may additionally include a power amplifier. The transmitter may additionally or alternatively include amplifiers, filters, signal processors and/or any other suitable components. The transmitter may function to scale, phase shift, delay, and/or otherwise modify the transmit signal. The digital-to-analog converter (DAC) functions to convert the digital transmit signal to a baseband or IF analog transmit signal, and the upconverter functions to upconvert the baseband or IF analog transmit signal from baseband or IF to RF (or any other intended transmission frequency).

The transmit coupler 210 functions to provide a sample of the analog transmit signal for the digital canceller 220 and/or the analog canceller 2400. Transmit couplers may additionally be used to split power between signal paths (e.g., splitting power between different analog canceller 240 blocks).

The transmit coupler 210 is preferably a short section directional transmission line coupler, but may additionally or alternatively be any power divider, power combiner, directional coupler, or other type of signal splitter. The transmit coupler 210 is preferably a passive coupler, but may additionally or alternatively be an active coupler (for instance, including power amplifiers). For example, the transmit coupler 210 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive or capacitive tee, and/or a resistive bridge hybrid coupler. The output ports of the transmit coupler 210 are preferably phase-shifted by ninety degrees, but may additionally or alternatively be in phase or phase shifted by any amount (e.g., zero degrees, 180 degrees).

The transmit coupler 210 may also be included in an active element in the transmitter; e.g. the PA or PMA (post mixer amplifier). This may be attractive with respect to cost and size for highly integrated systems like WLAN or cellular chips sets. Likewise the RX coupler may be integrated with e.g. the LNA in the receive chain.

Transmit couplers 210 may be arranged in series and/or in parallel. The configuration of multiple transmit couplers 210 in the system 200 is discussed in further detail in later sections.

The receive coupler 211 functions to combine one or more analog self-interference cancellation signals (from analog/digital cancellers) with the analog receive signal.

The receive coupler 211 is preferably a short section directional transmission line coupler, but can additionally or alternatively be any power divider, power combiner, directional coupler, or other type of signal splitter. The receive coupler 211 is preferably a passive coupler, but can additionally or alternatively be an active coupler (for instance, including power amplifiers). For example, the receive coupler 211 can comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the receive coupler 211 are preferably phase-shifted by ninety degrees, but can additionally or alternatively be in phase or phase shifted by any amount (e.g., zero degrees, 180 degrees).

Receive couplers 211 may be arranged in series and/or in parallel. The configuration of multiple receive couplers 211 in the system 200 is discussed in further detail in later sections.

The digital canceller 220 preferably includes the canceller 100 described above (and/or elements thereof); for example, the digital canceller 220 can be substantially similar to the canceller 100. However, the digital canceler 220 can additionally or alternatively be any suitable digital self-interference canceller and/or include any other suitable elements in any suitable arrangement.

The ADC 230 functions to convert a transmit signal from an analog signal to a digital signal; this signal is hereafter referred to as a converted transmit signal. Alternatively, the signal post-conversion may be referred to as an RF-sourced digital transmit signal (assuming conversion from an RF transmit signal) or an IF-sourced digital transmit signal (assuming conversion from an IF transmit signal).

In addition to analog-to-digital signal conversion, the ADC 230 may perform signal scaling (in either analog or digital domains) as well as frequency conversion (in either analog or digital domains) for input analog signals. In one implementation, the ADC 230 includes at least one of a variable-gain amplifier (VGA) and a digital scaler. The variable-gain amplifier functions to scale an analog signal before conversion via the ADC 230, while the digital scaler functions to scale a digital signal after conversion via the ADC 230. Both the VGA and digital scaler are preferably capable of scaling signals with any complex multiplier (e.g., resulting in both amplitude and phase shift), but may additionally or alternatively be capable of scaling signals with a subset of the set of complex numbers. For example, a VGA may only be capable of scaling signals by a real number between 1 and 4.

The ADC 231 is preferably substantially similar to the ADC 230, except the ADC 231 functions to convert a receive signal from an analog signal to a digital signal. The ADC 231 preferably is used to sample a receive signal post-self-interference cancellation (i.e., a residue signal) to evaluate self-interference canceller 220/240 performance and/or aid in canceller tuning. Note that the system 200 may include multiple ADCs 231, and they may sample receive signals of the system 200 at any point. For example, the system 200 may include three ADCs 231; one coupled to a receive signal prior to any self-interference cancellation, one coupled to a receive signal after analog self-interference cancellation but prior to digital self-interference cancellation, and one coupled to the receive signal after both analog and digital self-interference cancellation. Likewise, one ADC 231 may couple to all three of those signals.

The DAC 232 functions to convert the digital self-interference cancellation signal from a digital signal to an analog signal; this signal is hereafter referred to as a converted digital self-interference cancellation signal. Alternatively, the signal post-conversion may be referred to as an digitally-sourced RF self-interference cancellation signal (assuming conversion to RF) or a digitally-sourced IF self-interference cancellation signal (assuming conversion to IF).

In addition to digital-to-analog signal conversion, the DAC 232 may perform signal scaling (in either analog or digital domains) as well as frequency conversion (in either analog or digital domains) for input digital signals. In one implementation, the DAC 232 includes at least one of a variable-gain amplifier (VGA) and a digital scaler. The digital scaler functions to scale a digital signal before conversion via the DAC 232, while the VGA functions to scale an analog signal after conversion via the DAC 232. Both the VGA and digital scaler are preferably capable of scaling signals with any complex multiplier (e.g., resulting in both amplitude and phase shift), but may additionally or alternatively be capable of scaling signals with a subset of the set of complex numbers. For example, a VGA may only be capable of scaling signals by a real number between 1 and 4.

The analog self-interference canceller 240 functions to produce an analog self-interference cancellation signal from an analog transmit signal that can be combined with an analog receive signal to reduce self-interference present in the analog receive signal. The analog self-interference canceller 240 is preferably designed to operate at a single frequency band, but may additionally or alternatively be designed to operate at multiple frequency bands. The analog self-interference canceller 240 may include any of the circuits related to analog self-interference cancellation of U.S. patent application Ser. No. 14/569,354; e.g., the RF self-interference canceller, the IF self-interference canceller, associated up/downconverters, and/or tuning circuits.

The analog self-interference canceller 240 is preferably implemented as an analog circuit that transforms an analog transmit signal into an analog self-interference cancellation signal by combining a set of filtered, scaled, and/or delayed versions of the analog transmit signal, but may additionally or alternatively be implemented as any suitable circuit. For instance, the analog self-interference canceller 240 may perform a transformation involving only a single version or copy of the analog transmit signal. The transformed signal (the analog self-interference cancellation signal) preferably represents at least a part of the self-interference component received at the receiver.

The analog self-interference canceller 240 is preferably adaptable to changing self-interference parameters in addition to changes in the analog transmit signal; for example, transceiver temperature, ambient temperature, antenna configuration, humidity, and transmitter power. Adaptation of the analog self-interference canceller 240 is preferably performed by a tuning circuit, but may additionally or alternatively be performed by a control circuit or other control mechanism included in the canceller or any other suitable controller.

In particular, the analog self-interference canceller 240 may be paused (e.g., generation of an analog self-interference cancellation signal may temporarily cease) or otherwise disabled by a tuning circuit or other controller. Alternatively, tuning of the analog self-interference canceller 240 may be paused (e.g., an iterative tuning process stopped, temporarily or otherwise).

Note that while the preceding paragraphs primarily describe a SISO (single-input single-output) implementation of the system 200, the system 200 may additionally or alternatively be implemented as a MIMO (multiple-input, multiple-output) system (or MISO, SIMO, etc.). The system 200 may be a 2×2 MIMO system, but may additionally have any suitable number of transmit and receive signal paths. Each signal path may have separate antennas; alternatively, signal paths may share antennas via a duplexer or other coupler. In one example, a 2×2 MIMO system has four antennas: a TX1 antenna, a TX2 antenna, an RX1 antenna, and an RX2 antenna. In another example, a 2×2 MIMO system has two antennas: a TX1/RX1 antenna (coupled to both TX1 and RX1 signal paths via a duplexer) and a TX2/RX2 antenna (coupled to both TX2 and RX2 signal paths via a duplexer).

Note that while a particular configuration of input/output connections for the digital and analog cancellers 220 and 240 are described, any configuration of these inputs and outputs (e.g., using ADCs/DACs to couple the digital canceller to analog signals, including residue signals, as shown in FIG. 10) may be used.

In a MIMO implementation, the transmitter preferably has multiple inputs and outputs. In particular, the transmitter preferably includes a DAC and frequency upconverter for each transmit signal path; additionally or alternatively, transmit signal paths may share DACs and/or frequency upconverters. Additionally or alternatively, the transmitter may be any suitable MIMO transmitter (or the system 200 may couple to multiple transmitters); for example, the transmitter may include MIMO signal splitting or processing circuitry (which may be used to process a single digital signal into multiple MIMO analog signals).

Likewise, the receiver preferably has multiple inputs and outputs. In particular, the receiver preferably includes an ADC and frequency downconverter for each receive signal path; additionally or alternatively, receive signal paths may share ADCs and/or frequency downconverters. Additionally or alternatively, the receiver may be any suitable MIMO receiver (or the system 200 may couple to multiple receivers); for example, the receiver may include MIMO signal splitting or processing circuitry (which may be used to process a single digital signal into multiple MIMO analog signals).

In a MIMO implementation, the digital self-interference canceller 220 is preferably designed for MIMO operating environments (i.e., multiple transmit and/or receive signals). In MIMO operating environments, self-interference may occur across separate communications streams; for example, a TX1 signal may cause interference in both of RX1 and RX2 signals. The digital self-interference canceller 220 may include multiple cancellation sub-blocks (each incorporating some or all of the functionality of a SISO implementation of the digital self-interference canceller 220). For example, the digital self-interference canceller may include sub-blocks for each possible RX/TX pairing (e.g., RX1/TX1, RX1/TX2, etc.). In this implementation, each sub-block functions to remove self-interference resulting from a particular pairing; e.g., an RX1/TX2 sub-block functions to remove self-interference in the RX1 receive signal resulting from the TX2 transmit signal.

Similarly to the digital self-interference canceller 220, the analog self-interference canceller 240 (implemented in a MIMO system) may split analog self-interference cancellation duties into sub-blocks or sub-circuits as previously described.

However, the system 200 can additionally or alternatively include any other suitable elements in any suitable arrangement.

4. Method for Digital Self-Interference Cancellation

Figure 11:
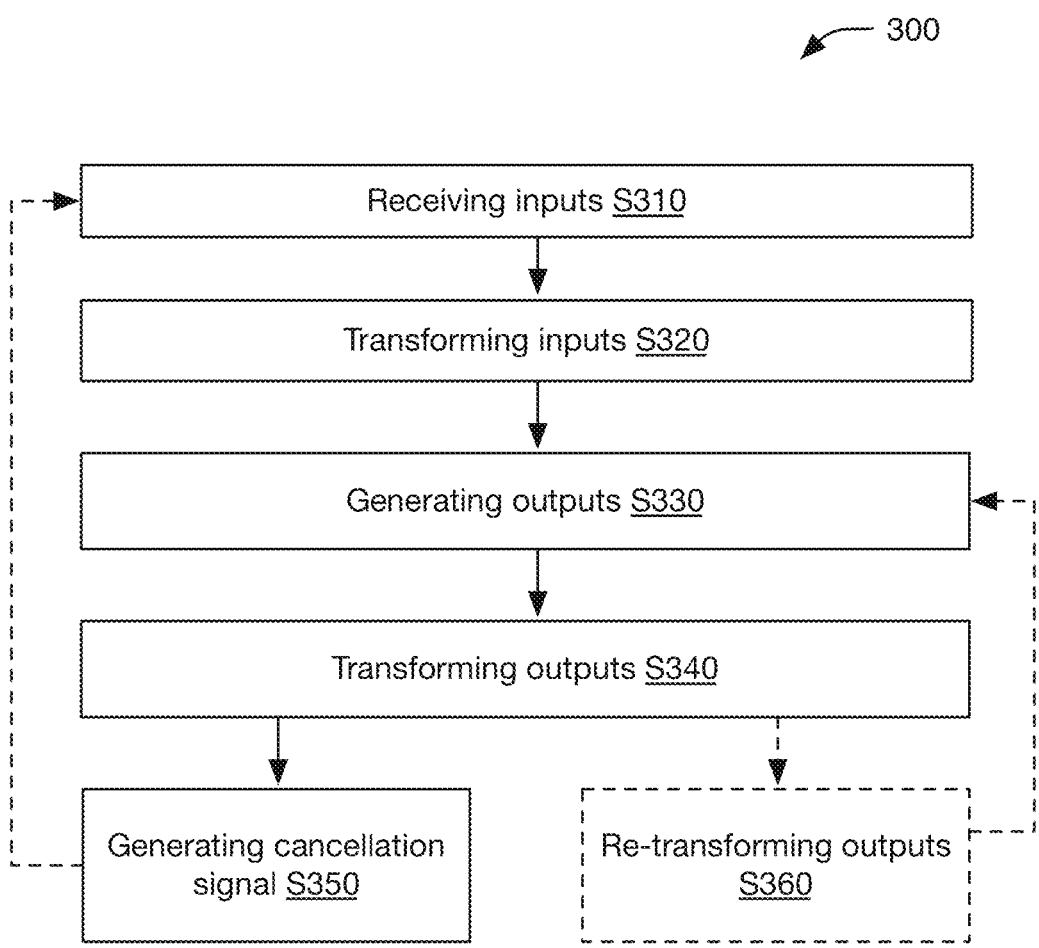
FIG. 11 is a schematic representation of an embodiment of a method for digital self-interference cancellation.

A method 300 for digital self-interference cancellation preferably includes: receiving inputs S310; transforming the inputs S320; generating outputs based on the transformed inputs S330; transforming the outputs S340; and/or generating a cancellation signal based on the outputs S350; and can optionally include re-transforming the outputs S360 (e.g., as shown in FIG. 11). The method 300 is preferably implemented using the canceller 100 and/or system 200 described above, but can additionally or alternatively be performed using any other suitable elements.

S310 preferably functions to receive one or more input signals for use in self-interference cancellation. The input signals preferably include a transmit signal and a residue signal (e.g., as described above regarding signals of the canceller 100 and/or system 200). The input signals are preferably digital signals, but can additionally or alternatively include analog signals such as RF, IF, and/or baseband signals, and/or signals in any other suitable representation. The signals are preferably time-domain signals, and are preferably received by an FD transformer (e.g., the "first FD transformer" described above regarding the canceller 100). However, S310 can additionally or alternatively include receiving any other suitable signals in any suitable manner.

S320 preferably functions to transform the signals received in S310 from the time domain to the frequency domain. S320 is preferably performed by the FD transformer (e.g., "first FD transformer"). S320 preferably includes transforming the signals without pre-compensation and/or upsampling (e.g., performing a high-dimensionality fast Fourier transform on a high-resolution signal, rather than a low-dimensionality transform on a lower-resolution signal), such as described above regarding operation of the first FD transformer. In alternate embodiments, S320 can include transforming one or more of the signals in a manner analogous to that described below regarding S360, such as by pre-compensating, transforming (e.g., with low dimensionality), and/or filtering the signals. However, S320 can additionally or alternatively include transforming the signals in any other suitable manner.

S330 preferably functions to determine one or more channel estimates based on the transformed inputs (e.g., as described above, such as regarding elements 130, 150, 160, 170, and/or 180, etc.), and preferably includes providing the channel estimates as outputs. In some embodiments, S330 is performed based further on the re-transformed outputs (e.g., self-interference channel estimates) generated in S360 (e.g., stored in memory and combined with updated transformed inputs, such as described above regarding the canceller 100). S330 is preferably performed in the frequency domain, but can additionally or alternatively be performed in the time domain and/or otherwise performed. However, S330 can additionally or alternatively include generating any other suitable outputs in any suitable manner.

Figure 12:
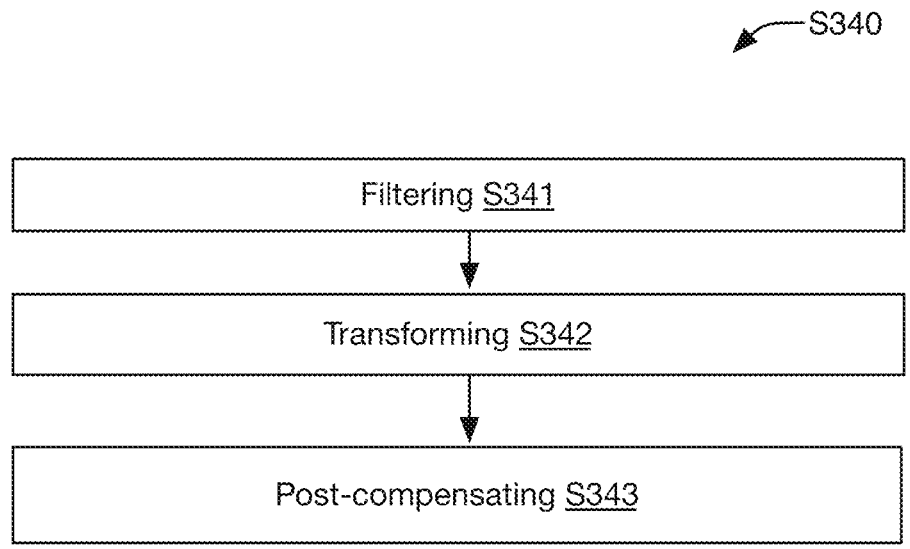
FIGS. 12-13 are schematic representations of examples of a first and second element, respectively, of the embodiment of FIG. 11.

S340 preferably functions to transform the output(s) generated in S330 from the frequency domain to the time domain. S340 is preferably performed by the TD transformer (e.g., TD transformer 120 described above), but can additionally or alternatively be performed by any other suitable elements. In some embodiments, S340 includes: filtering the outputs S341; transforming the filtered outputs S342; and/or post-compensating the transformed outputs S343 (e.g., as shown in FIG. 12). S341 preferably functions to downsample the outputs, and is preferably performed by a decimating filter (e.g., the filter 121 described above), but can additionally or alternatively be performed by any other suitable elements. S341 is preferably performed in the frequency domain, but can alternatively be performed in the time domain and/or otherwise performed. S342 preferably includes performing an inverse fast Fourier transform on the filtered outputs, and is preferably performed by the IFFT processor 122 described above (but can additionally or alternatively be performed by any other suitable elements). S343 is preferably performed by the post-compensator 123 described above (but can additionally or alternatively be performed by any other suitable elements), and preferably functions to compensate for distortion introduced by filtering the outputs S341. S343 is preferably performed in the time domain, but can alternatively be performed in the frequency domain and/or otherwise performed. In alternate embodiments, S340 includes transforming one or more of the outputs without downsampling and/or post-compensation (e.g., performing a high-dimensionality inverse fast Fourier transform on a high-resolution signal, rather than a low-dimensionality transform on a lower-resolution signal). However, S320 can additionally or alternatively include transforming the signals in any other suitable manner.

S350 preferably functions to generate a self-interference cancellation signal based on the output(s). S350 is preferably performed by the composer 140 described above, but can additionally or alternatively be performed by any other suitable elements. S350 is preferably performed in the time-domain, and preferably performed based on the transformed outputs (e.g., time-domain channel estimates). However, S350 can additionally or alternatively be performed in the frequency domain and/or performed based on frequency-domain outputs, such as un-transformed outputs and/or re-transformed outputs, and/or based on any other suitable information. In some embodiments, S350 includes filtering the outputs and/or one or more of the inputs (e.g., the transmit signal), such as described above. However, S350 can additionally or alternatively include generating any other suitable cancellation signal in any suitable manner.

The method 300 can optionally include performing one or more additional transformations. For example, the method 300 can include re-transforming the transformed outputs S360 (e.g., the time-domain channel estimates generated in S340). Such re-transformation is preferably performed by an FD transformer (e.g., the "second FD transformer" described above), but can additionally or alternatively be performed by any other suitable elements.

Figure 13:
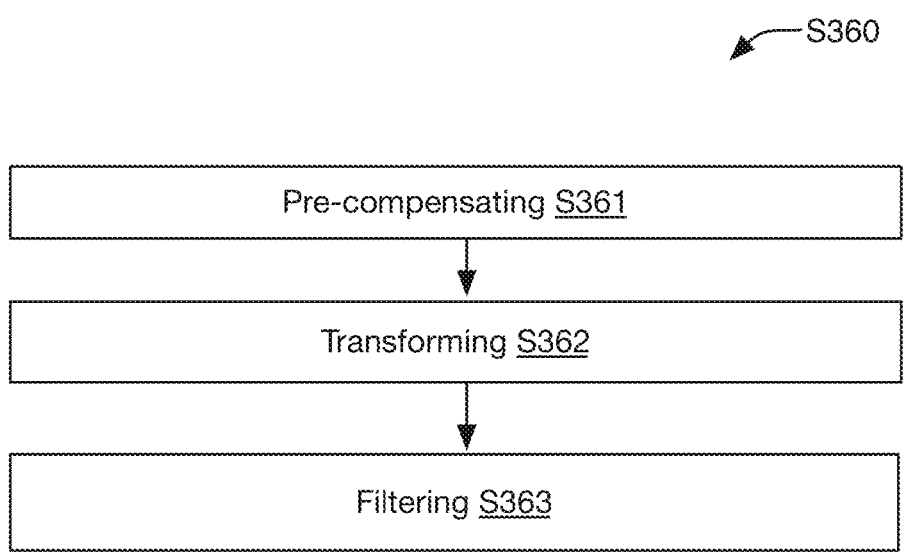

In some embodiments, S360 includes: pre-compensating the outputs S361; transforming the pre-compensated outputs S362; and/or filtering the transformed outputs S363 (e.g., as shown in FIG. 13). S361 is preferably performed by the pre-compensator 121 described above (but can additionally or alternatively be performed by any other suitable elements), and preferably functions to compensate for distortion introduced by filtering the transformed outputs S363. S361 is preferably performed in the time domain, but can alternatively be performed in the frequency domain and/or otherwise performed. S362 preferably functions to transform the outputs from the time domain to the frequency domain. S362 preferably includes performing a fast Fourier transform on the outputs (e.g., the pre-compensated outputs), and is preferably performed by the FFT processor 112 described above (but can additionally or alternatively be performed by any other suitable elements). S363 preferably functions to upsample the transformed outputs, and is preferably performed by an upsampling filter (e.g., the filter 113 described above), but can additionally or alternatively be performed by any other suitable elements. S363 is preferably performed in the frequency domain, but can alternatively be performed in the time domain and/or otherwise performed. The configuration of the re-transformation processes (e.g., configuration of second FD transformer elements such as the pre-compensator, FFT processor, and/or upsampling filter) is preferably informed by the configuration of the transformation process of S340. For example, analogous window functions, up/downsampling factors, other filter configurations, and/or (I)FFT configurations (e.g., dimensionality) can be used in S340 and S360. However, S360 can additionally or alternatively be performed in any other suitable manner.

The method 300 can optionally include implementing any or all of the functionality described above regarding the canceller 100 and/or system 200. However, the method 300 can additionally or alternatively include performing any other suitable elements in any suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A system for digital self-interference cancellation, the system comprising:
   a first transformer that transforms a digital transmit signal and a digital residue signal of a communication system from a time domain to a frequency domain;
   a channel estimator, communicatively coupled to the first transformer, that generates a self-interference channel estimate in the frequency domain based on the digital transmit signal and the digital residue signal;
a second transformer that transforms the self-interference channel estimate from the frequency domain to the time domain, the second transformer comprising:
   a decimating filter that, in the frequency domain, downsamples the self-interference channel estimate to generate a low-dimension channel estimate;
   an inverse fast Fourier transform (IFFT) processor that transforms the low-dimension channel estimate from the frequency domain to the time domain; and
   a post-compensator that, in the time domain, generates a compensated channel estimate based on the low-dimension channel estimate; and
a composer, communicatively coupled to the post-compensator, that, in the time domain, generates a digital self-interference cancellation signal based on the digital transmit signal and the compensated channel estimate;
wherein the digital self-interference cancellation signal is combined with a receive signal of the communication system to form the digital residue signal.

2. The system of claim 1, wherein:
the decimating filter defines a window function that is substantially non-flat in the time domain, wherein the decimating filter distorts the low-dimension channel estimate based on the window function; and
the post-compensator generates the compensated channel estimate based further on the window function.

3. The system of claim 2, wherein the window function is associated with a discrete prolate spheroidal function.

4. The system of claim 2, wherein generating the compensated channel estimate comprises dividing the low-dimension channel estimate by the window function.

5. The system of claim 1, wherein the decimating filter is a finite impulse response filter.

6. The system of claim 1, wherein:
the IFFT processor implements an IFFT butterfly structure defining a plurality of stages, wherein a stage of the plurality defines a radix; and
the decimating filter downsamples the self-interference channel estimate by a downsampling factor greater than or equal to the radix.

7. The system of claim 6, wherein the downsampling factor is greater than or equal to a square of the radix.

8. The system of claim 7, wherein the radix is greater than 3.

9. The system of claim 1, wherein the decimating filter downsamples the self-interference channel estimate by a downsampling factor greater than or equal to 10.

10. The system of claim 1, further comprising:
a third transformer, coupled to the second transformer, comprising:
   a fast Fourier transform (FFT) processor that transforms the compensated channel estimate into a low-dimension frequency-domain self-interference channel estimate; and
   an upsampling filter that, in the frequency domain, upsamples the low-dimension frequency-domain self-interference channel estimate to generate an upsampled channel estimate; and
a channel memory, coupled to the upsampling filter, that stores the upsampled channel estimate;
wherein the system modifies, in the frequency domain, the frequency-domain self-interference channel estimate based on the upsampled channel estimate; wherein the second transformer transforms the frequency-domain self-interference channel estimate after modification based on the upsampled channel estimate.

11. The system of claim 10, wherein:
the upsampling filter defines a first window function that is substantially non-flat in the time domain, wherein the upsampling filter distorts the upsampled channel estimate based on the first window function;
the third transformer further comprises a pre-compensator that further compensates the compensated channel estimate based on the first window function; and
the FFT processor transforms the compensated channel estimate into the low-dimension frequency-domain self-interference channel estimate after compensation by the pre-compensator.

12. The system of claim 11, wherein:
the decimating filter defines a second window function that is substantially non-flat in the time domain, wherein the decimating filter distorts the low-dimension channel estimate based on the second window function; and
the post-compensator generates the compensated channel estimate based further on the second window function.

13. The system of claim 12, wherein the first window function is substantially equal to the second window function.

14. The system of claim 11, wherein the first window function is associated with a discrete prolate spheroidal function.

15. The system of claim 11, wherein further compensating the compensated channel estimate comprises dividing the compensated channel estimate by the first window function.

16. The system of claim 11, wherein the upsampling filter is a finite impulse response filter.

17. The system of claim 10, wherein:
the FFT processor implements an FFT butterfly structure defining a plurality of stages, wherein a stage of the plurality defines a radix; and
the upsampling filter upsamples the low-dimension frequency-domain self-interference channel estimate by an upsampling factor greater than or equal to the radix.

18. The system of claim 17, wherein:
the IFFT processor implements an IFFT butterfly structure defining a second plurality of stages, wherein a stage of the second plurality defines a second radix equal to the radix; and
the decimating filter downsamples the self-interference channel estimate by an upsampling factor greater than or equal to the radix.

19. The system of claim 1, wherein the first transformer comprises:
a pre-compensator that, in the time domain, generates a compensated transmit signal based on the digital transmit signal and generates a compensated residue signal based on the digital residue signal;
a fast Fourier transform processor that transforms the compensated transmit signal into a low-dimension frequency-domain transmit signal, and that transforms the compensated residue signal into a low-dimension frequency-domain residue signal; and
an upsampling filter that, in the frequency domain, upsamples the low-dimension frequency-domain transmit signal to generate an upsampled transmit signal, and that upsamples the low-dimension frequency-domain residue signal to generate an upsampled residue signal;

wherein the channel estimator generates the self-interference channel estimate based on the upsampled transmit signal and the upsampled residue signal.

* * * * *